(12) United States Patent
Hochberg et al.

(10) Patent No.: US 8,818,141 B1
(45) Date of Patent: Aug. 26, 2014

(54) TRANSMISSION LINE DRIVEN SLOT WAVEGUIDE MACH-ZEHNDER INTERFEROMETERS

(75) Inventors: Michael J. Hochberg, Seattle, WA (US); Tom Baehr-Jones, Seattle, WA (US); Jeremy Witzens, Aachen (DE)

(73) Assignee: University of Washington, Seattle, WA (US)

( * ) Notice: Subject to any disclaimer, the term of this patent is extended or adjusted under 35 U.S.C. 154(b) by 220 days.

(21) Appl. No.: 13/169,882

(22) Filed: Jun. 27, 2011

Related U.S. Application Data

(60) Provisional application No. 61/358,809, filed on Jun. 25, 2010.

(51) Int. Cl.
*G02F 1/035* (2006.01)
*G02F 1/225* (2006.01)

(52) U.S. Cl.
USPC .................................................. 385/3; 385/2

(58) Field of Classification Search
None
See application file for complete search history.

(56) References Cited

U.S. PATENT DOCUMENTS

| | | |
|---|---|---|
| 5,061,028 A | 10/1991 | Khanarian et al. |
| 5,061,048 A | 10/1991 | Hayden et al. |
| 5,309,531 A | 5/1994 | Sheehy |
| 5,333,000 A | 7/1994 | Hietala et al. |
| 5,543,805 A | 8/1996 | Thaniyavarn |
| 5,654,818 A | 8/1997 | Yao |
| 5,694,134 A | 12/1997 | Barnes |
| 5,815,309 A | 9/1998 | Lawrence et al. |
| 6,128,421 A | 10/2000 | Roberts |
| 6,252,557 B1 | 6/2001 | Plugge et al. |
| 6,290,253 B1 | 9/2001 | Tietze et al. |
| 7,043,133 B2 | 5/2006 | Johnson et al. |
| 7,072,531 B2 | 7/2006 | Djordjev |
| 7,181,114 B2 | 2/2007 | Lee et al. |
| 7,200,308 B2 | 4/2007 | Hochberg et al. |
| 7,424,192 B2 | 9/2008 | Hochberg et al. |
| 7,474,811 B1 | 1/2009 | Quitoriano et al. |
| 7,643,714 B2 | 1/2010 | Hochberg et al. |
| 7,894,696 B2 | 2/2011 | Baehr-Jones et al. |
| 8,081,851 B2 * | 12/2011 | Koos et al. .................. 385/2 |
| 8,380,016 B1 * | 2/2013 | Hochberg et al. ............. 385/3 |

(Continued)

FOREIGN PATENT DOCUMENTS

| | | |
|---|---|---|
| JP | 06-075255 | 3/1994 |
| KR | 10-175743 | 5/1999 |
| WO | WO-2009/111610 | 9/2009 |
| WO | WO-2009/134506 | 11/2009 |

OTHER PUBLICATIONS

J. Witzens et al. Design of transmission line driven slot waveguide Mach-Zehnder interferometers and application to analog optical links. Optics Express,18:16:16902-16928, Aug. 2010.*

(Continued)

*Primary Examiner* — Mike Stahl
(74) *Attorney, Agent, or Firm* — Dorsey & Whitney LLP

(57) ABSTRACT

A Mach-Zehnder interferometer useful for analog or digital optical signal manipulation. In one example, the MZI is configured as an optical device that provides a balanced output. In another example, the MZI is configured as an optical device that provides a single ended output. Each device uses a silicon split or slotted wave guide having an electro-optically active material present within the slot. The balanced output device uses two slotted wave guides in push-pull configuration.

18 Claims, 30 Drawing Sheets

(56) References Cited

U.S. PATENT DOCUMENTS

| | | |
|---|---|---|
| 8,390,922 B1 | 3/2013 | Baehr-Jones et al. |
| 2002/0090160 A1 | 7/2002 | Lim et al. |
| 2003/0152346 A1 | 8/2003 | Aso et al. |
| 2004/0202429 A1 | 10/2004 | Margalit et al. |
| 2005/0074194 A1 | 4/2005 | Tan et al. |
| 2005/0111802 A1 | 5/2005 | Lee et al. |
| 2005/0242287 A1 | 11/2005 | Hakimi |
| 2006/0056760 A1 | 3/2006 | Djordjev et al. |
| 2006/0133720 A1 | 6/2006 | Hochberg et al. |
| 2007/0035800 A1 | 2/2007 | Hochberg et al. |
| 2007/0133918 A1 | 6/2007 | Cho et al. |
| 2008/0002992 A1 | 1/2008 | Hochberg et al. |
| 2008/0165565 A1 | 7/2008 | Gunter et al. |
| 2009/0022445 A1* | 1/2009 | Hochberg et al. .......... 385/3 |
| 2009/0067771 A1* | 3/2009 | Chen et al. .......... 385/3 |
| 2009/0123108 A1 | 5/2009 | Baehr-Jones et al. |
| 2009/0148095 A1 | 6/2009 | Pesetski et al. |
| 2010/0002994 A1 | 1/2010 | Baehr-Jones et al. |
| 2011/0170820 A1* | 7/2011 | Prather et al. .......... 385/2 |
| 2012/0039560 A1 | 2/2012 | Mazur et al. |

OTHER PUBLICATIONS

Barrios, et al., "Electrooptic Modulation of Silicon-on-Insulator Submicrometer-Size Waveguide Devices", Journal of Lightwave Technology vol. 21, No. 10, Oct. 2003, 2332-2339.

Forst, et al., "High-speed all-optical switching in ion-implanted silicon-on-insulator microring resonators", Optics Letters vol. 32, No. 14, Jul. 15, 2007, 2046-2048.

Geis, et al., "CMOS-Compatible All-Si High-Speed Waveguide Photodiodes With High Responsivity in Near-Infrared Communication Band", IEEE Photonics Technology Letters vol. 19, No. 3, Feb. 1, 2007, 152-153.

Jen, et al., "Exceptional electro-optic properties through molecular design and controlled self-assembly", Proceedings of SPIE vol. 5935, Aug. 2005, 593506-1-593506-13.

Lipson, "Guiding, Modulating, and Emitting Light on Silicon—Challenges and Opportunities", Journal of Lightwave Technology vol. 23, No. 12, Dec. 2005, 4222-4238.

Rahman, et al., "Polarization Crosstalk in High Index Contrast Planar Silica Waveguides", IEEE Photonics Technology Letters vol. 14, No. 8, Aug. 2002, 1109-1111.

Tazawa, et al., "Analysis of Ring Resonator-Based Traveling-Wave Modulators", IEEE Photonics Technology Letters vol. 18, No. 1, Jan. 1, 2006, 211-213.

Tazawa, et al., "Ring Resonator-Based Electrooptic Polymer Traveling-Wave Modulator", Journal of Lightwave Technology vol. 24, No. 9, Sep. 2006, 3514-3519.

Zhang, et al., "Low V Electrooptic Modulators from CLD-1: Chromophore Design and Synthesis, Material Processing, and Characterization", Chemistry of Materials vol. 13, May 2001, 3043-3050.

* cited by examiner

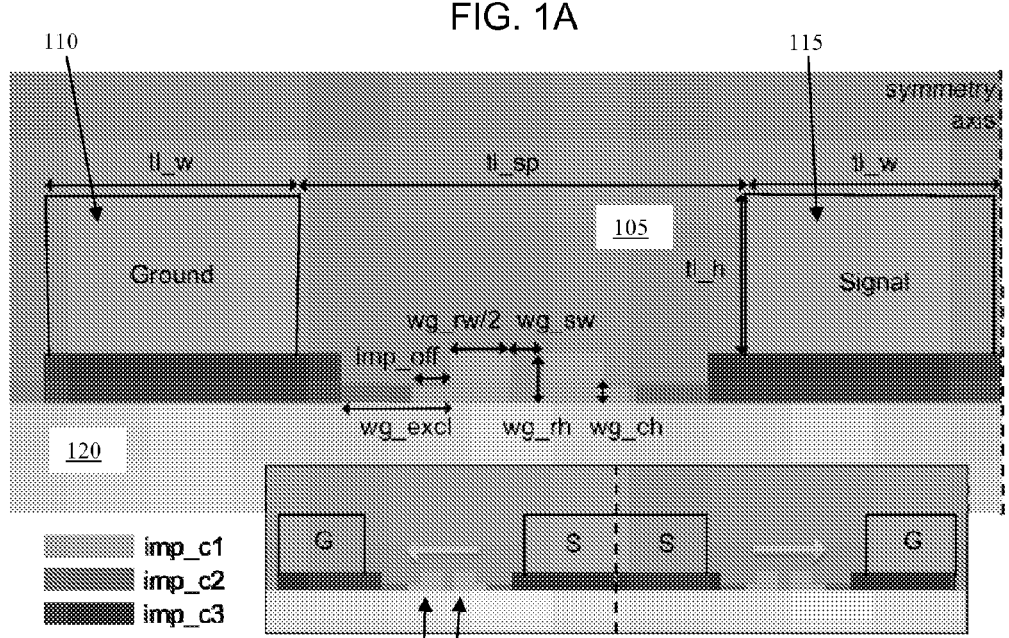
FIG. 1A
FIG. 1B
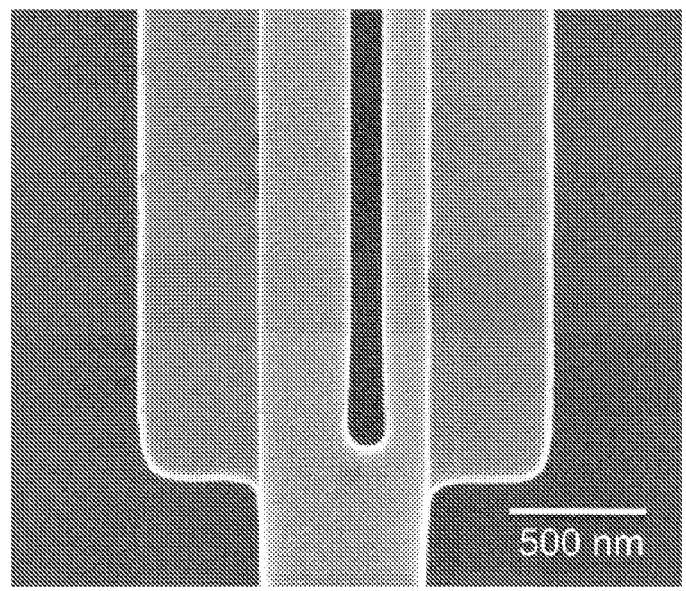
FIG. 2

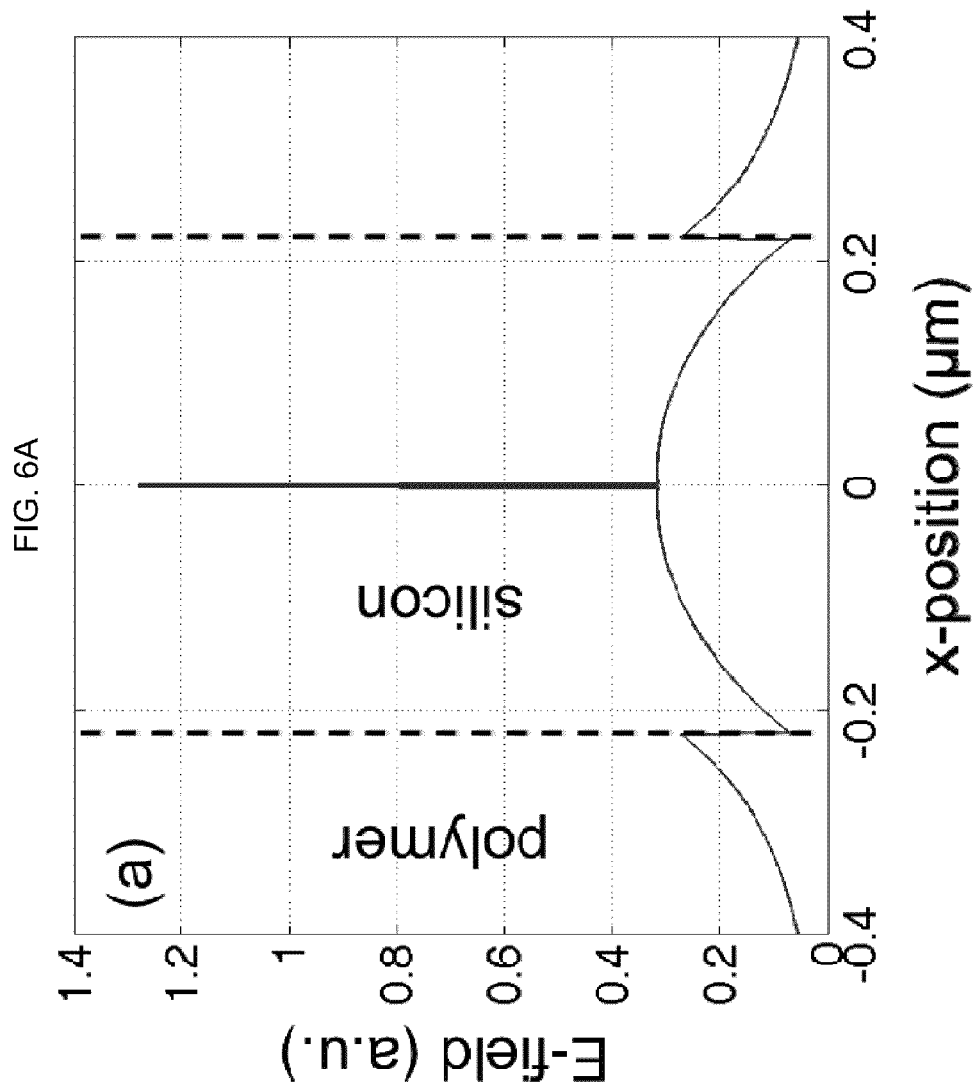

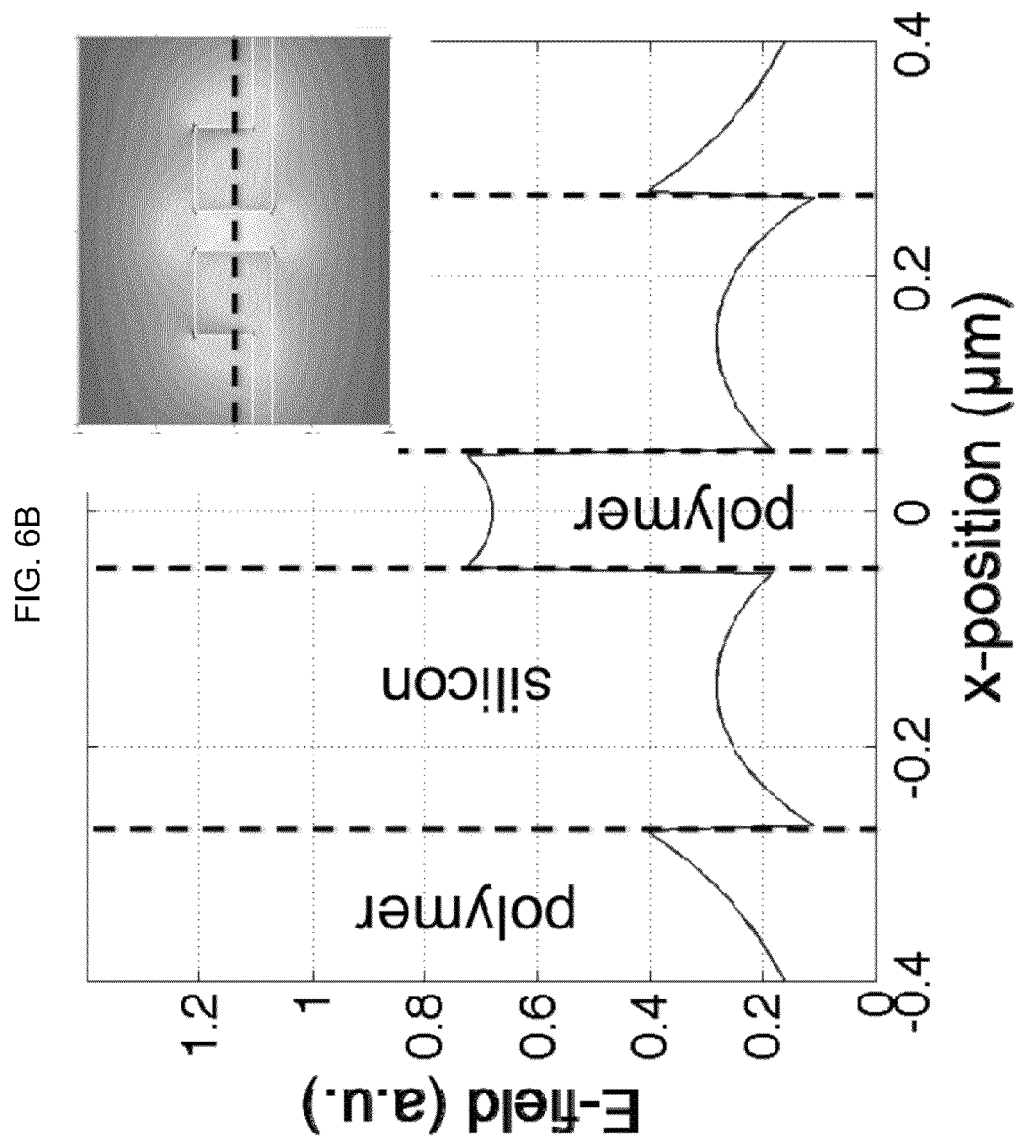

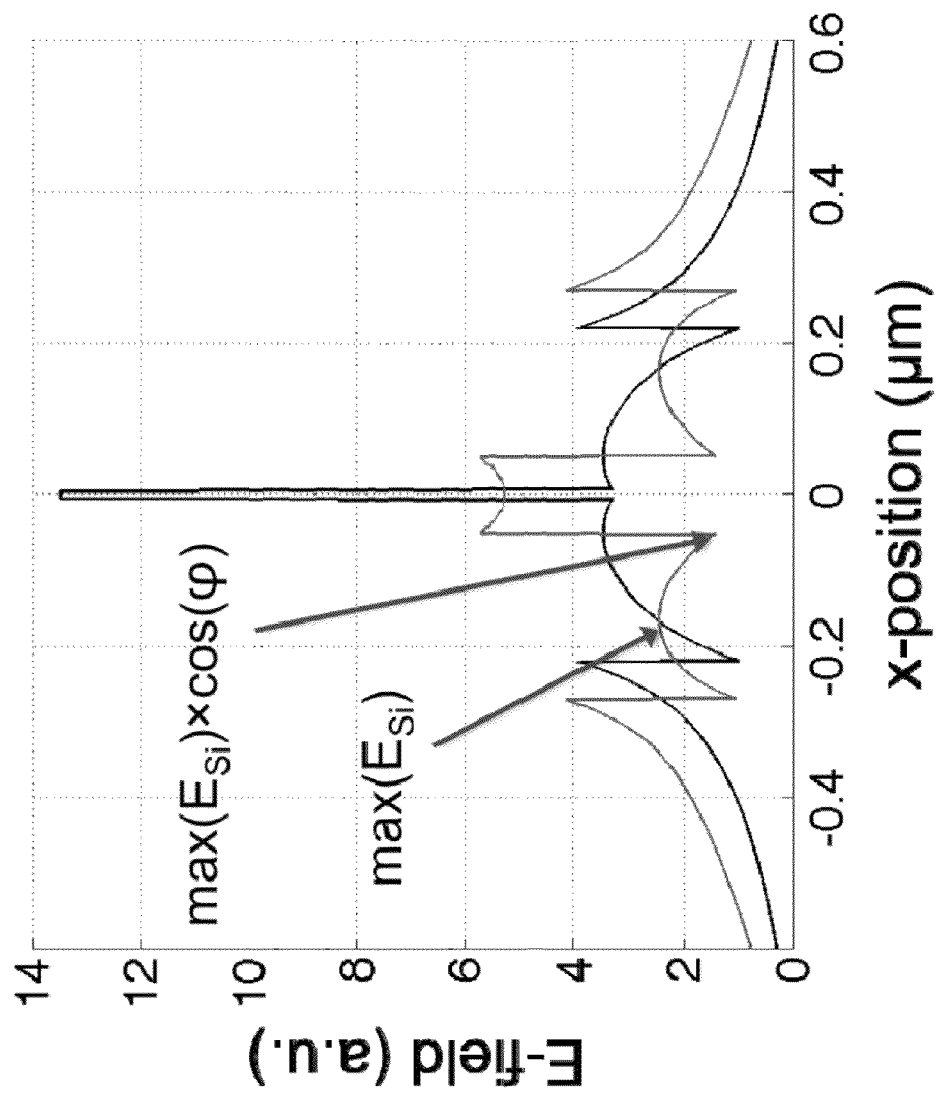

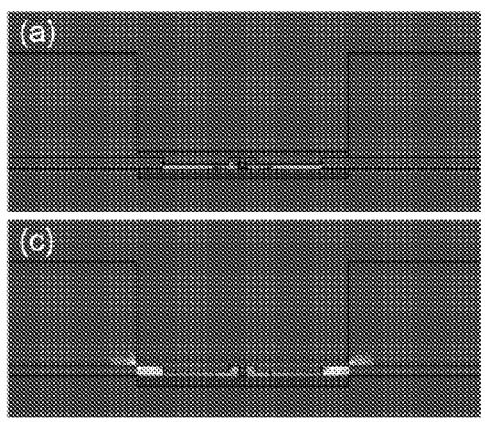
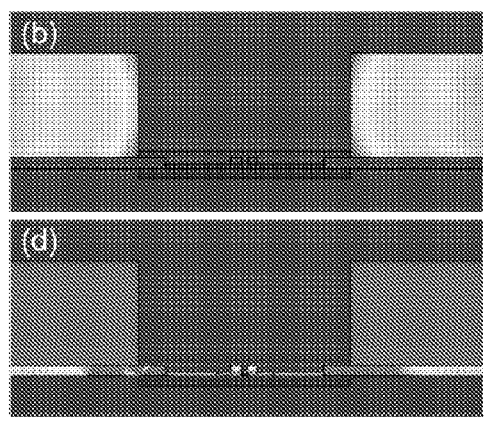
FIG. 14A  FIG. 14B
FIG. 14C  FIG. 14D
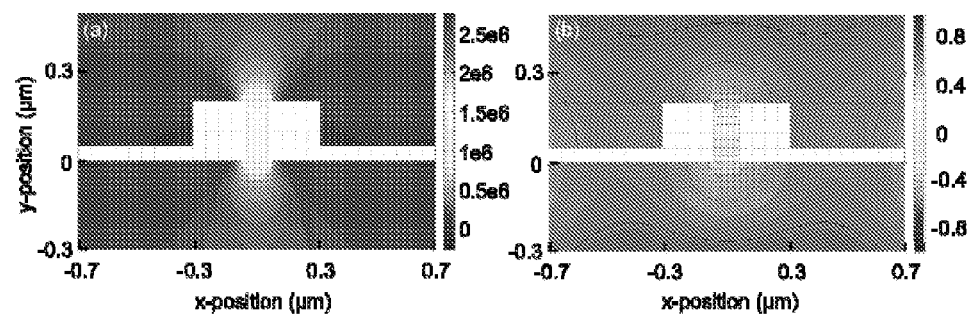
FIG. 15A  FIG. 15B

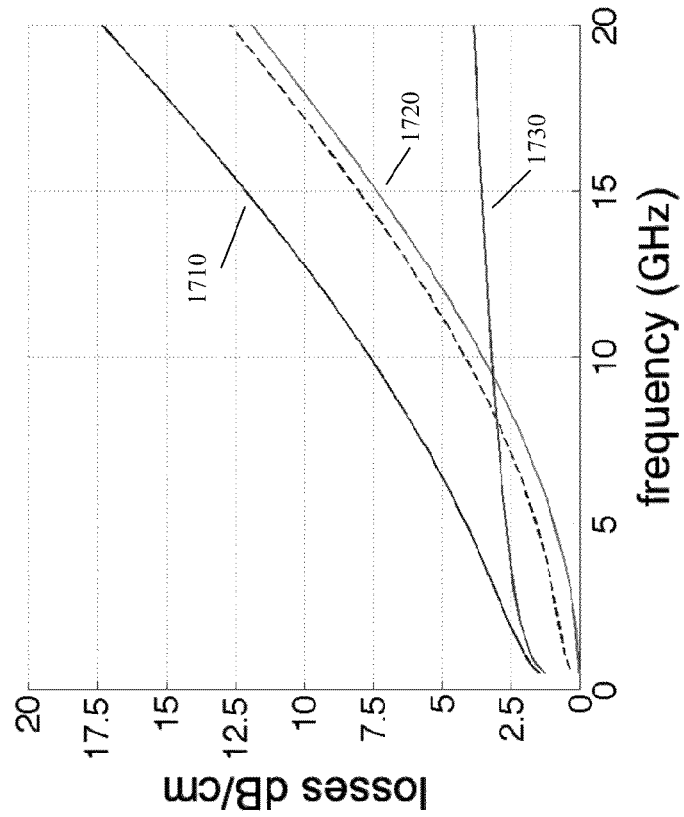
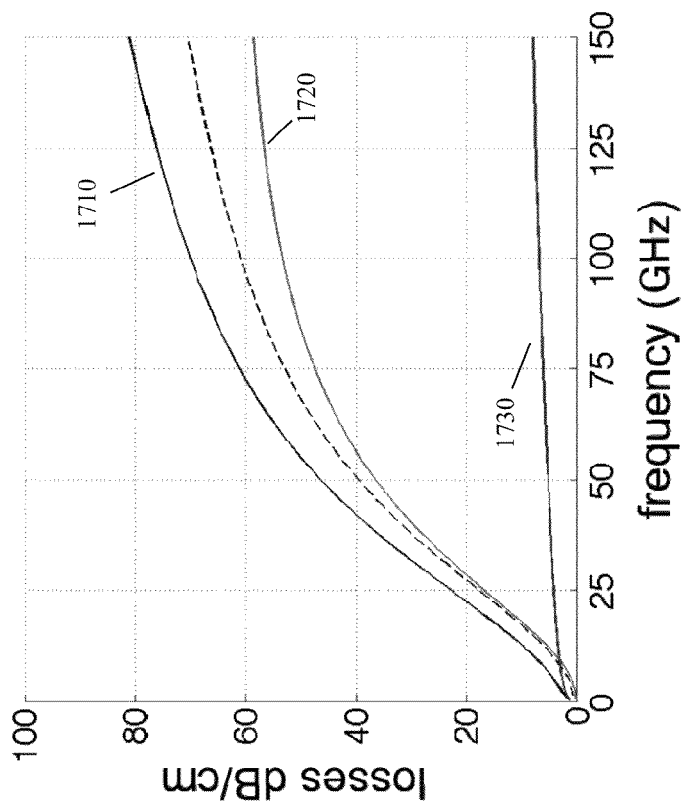
FIG. 17B
FIG. 17A

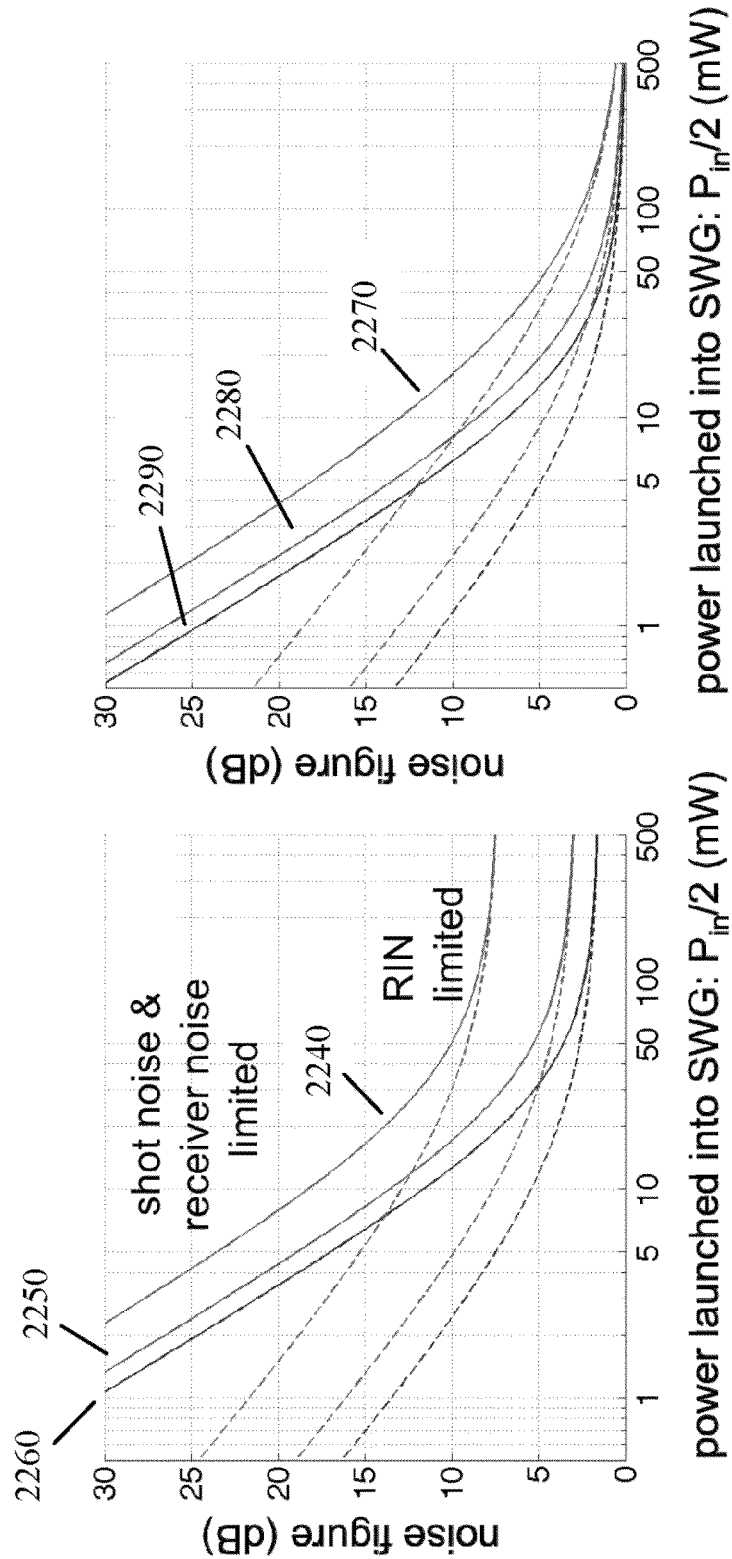

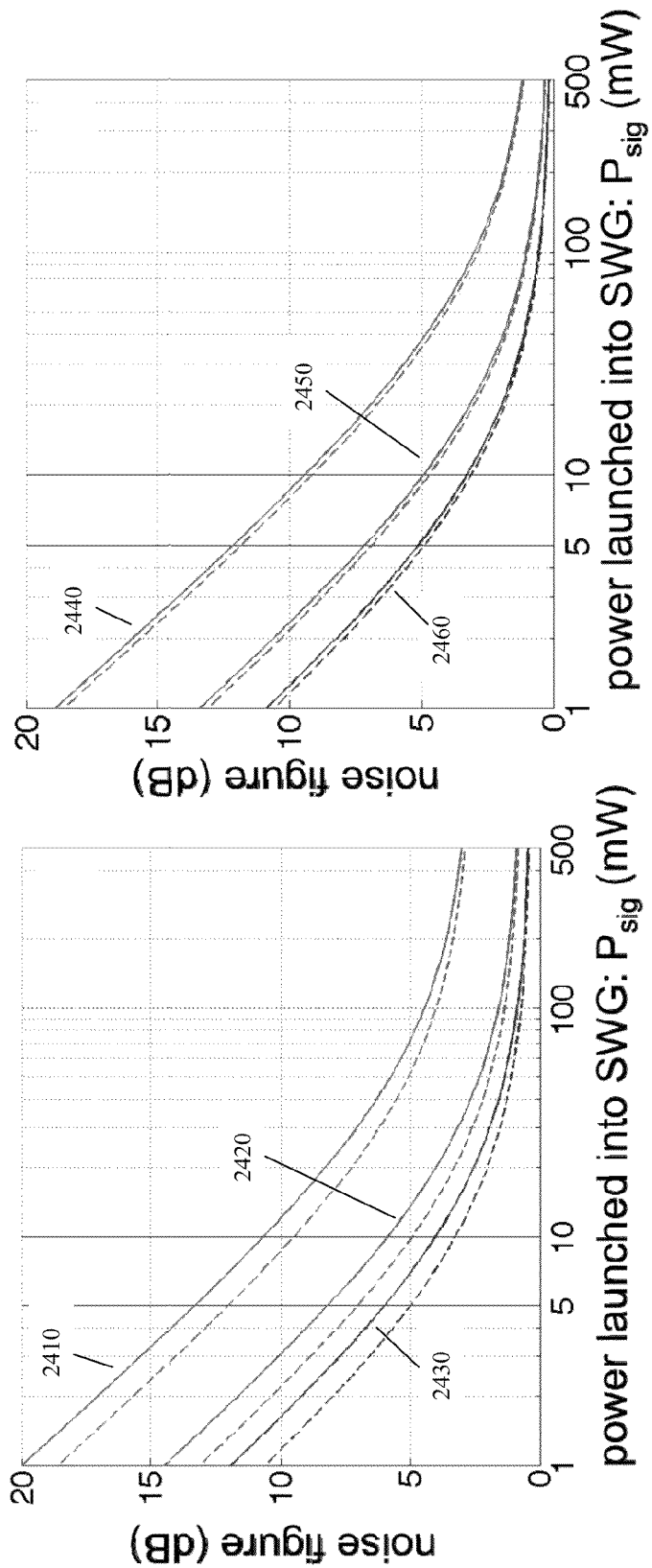

TRANSMISSION LINE DRIVEN SLOT WAVEGUIDE MACH-ZEHNDER INTERFEROMETERS

CROSS-REFERENCE TO RELATED APPLICATIONS

This application claims priority to and the benefit of U.S. provisional patent application Ser. No. 61/358,809, filed Jun. 25, 2010, which application is incorporated herein by reference in its entirety.

FIELD OF THE INVENTION

The invention relates to optical modulators in general and particularly to optical modulators that include slot waveguides.

BACKGROUND OF THE INVENTION

Recent advances in non-linear optical polymers make them extremely promising materials for high performance optical modulators. Electro-optic coefficients as high as $r_{33}$=300 pm/V have been demonstrated, and polymer based modulators with high reliability have been made commercially available. These advances have been enhanced by novel device design. In particular silicon waveguides with a narrow slot in the middle, so called slot waveguides (SWG), have been shown to yield high confinement of the optical field inside the slot. The same structures also allow dropping the entire radio-frequency (RF) driving voltage across the narrow slot, thus yielding very high RF E-fields with high optical overlaps. This allows modulators with ultra low drive voltages to be realized.

$V_\pi$ is the voltage required to induce TE phase shift between the two arms of the modulator. The definition of $V_\pi$ has been adjusted to be consistent with the nomenclature used herein. A low $V_\pi$ has several advantages such as reduced transmitter (Tx) power-consumption in digital data-communication links. It is particularly attractive in the context of optical analog links, where it translates directly into enhanced noise figures since the electrical-to-electrical power gain and the noise factor of the link scale respectively as $V_\pi^{-2}$ and $V_\pi^2$. Analog links are receiving a lot of attention for their application in radar remoting and phased arrays and the availability of low noise optical analog links is predicted to have a tremendous impact on this field.

It has been recognized early on that electro-optic polymers constitute a promising material for low $V_\pi$ modulators. Low drive voltage modulators have also motivated a considerable amount of research in the lithium niobate community, with $V_\pi$ as low as 1.1 V and 1.35 V at respectively 12 GHz and 18 GHz demonstrated with commercially available high bandwidth modulators targeted towards analog optical links. High-speed (>10 GHz) modulators in silicon have also been a very active field in the last decade, and recently important progress has been made towards low voltage modulation with the demonstration of a $V_\pi$ of 2 V.

Known in the prior art is Hochberg et al., U.S. Pat. No. 7,200,308, issued Apr. 3, 2007, which is said to disclose systems and methods for manipulating light with high index contrast waveguides clad with substances having that exhibit large nonlinear electro-optic constants $\chi^2$ and $\chi^3$. Waveguides fabricated on SOI wafers and clad with electro-optic polymers are described. Embodiments of waveguides having slots, electrical contacts, and input waveguide couplers are discussed. Waveguides having closed loop structures (such as rings and ovals) as well as linear or serpentine waveguides, are described. Optical signal processing methods, such as optical rectification and optical modulation, are disclosed.

There is a need for improved optical modulation systems and methods.

SUMMARY OF THE INVENTION

According to one aspect, the invention features a Mach-Zehnder interferometer having a balanced output. The Mach-Zehnder interferometer comprises a slotted wave guide having at least two silicon elements defining a slot therebetween, the at least two silicon elements having an electro-optically active material disposed within the slot, and configured to apply an electromagnetic field to the electro-optically active material, the slotted waveguide configured as a first arm of the Mach-Zehnder interferometer, and an optical fiber configured as a second arm of the Mach-Zehnder interferometer; an optical input port of the Mach-Zehnder interferometer configured to receive an optical signal comprising a signal component having a signal amplitude $P_{sig}$ and a power component having a power amplitude $P_{amp}$, the optical input port configured to apply the signal component to the first arm of the Mach-Zehnder interferometer and configured to apply the power component to the second arm of the Mach-Zehnder interferometer; an optical output port of the Mach-Zehnder interferometer configured to provide a balanced optical output signal; and an electrical input port configured to receive an input electrical signal having a radio frequency component with instantaneous amplitude V, and having a driver configured to apply the radio frequency signal component as a data signal relative to a ground signal to the at least two silicon elements of the slotted wave guide, the Mach-Zehnder interferometer configured to provide at the optical output port a balanced optical signal. In one embodiment, the Mach-Zehnder interferometer is configured to provide a balanced optical signal having an amplitude $A_1$ $$A_1 = \frac{P_{sig}}{2} + \frac{P_{amp}}{2} + \sqrt{P_{sig}P_{amp}} \sin\left(\frac{\pi}{V_\pi}\frac{V}{2}\right)$$

on one arm and an amplitude $A_2$ $$A_2 = \frac{P_{sig}}{2} + \frac{P_{amp}}{2} + \sqrt{P_{sig}P_{amp}} \sin\left(\frac{\pi}{V_\pi}\frac{V}{2}\right)$$

on another arm.

In one embodiment, the input electrical signal is an analog signal.

In another embodiment, the input electrical signal is a digital signal.

In yet another embodiment, the Mach-Zehnder interferometer is configured to operate at a frequency of 10 GHz.

In still another embodiment, the Mach-Zehnder interferometer is configured to operate at a frequency of 20 GHz.

In a further embodiment, the Mach-Zehnder interferometer is configured to operate at a frequency of 50 GHz.

In still another embodiment, the signal component having a signal amplitude $P_{sig}$ is unmodulated.

In yet another embodiment, the power component having a power amplitude $P_{amp}$ is unmodulated.

In a further embodiment, the Mach-Zehnder interferometer further comprises a fiber optic link and a balanced photodetector receiver.

According to another aspect, the invention relates to A Mach-Zehnder interferometer having a single-ended output. The Mach-Zehnder interferometer comprises a first slotted wave guide having at least two silicon elements defining a slot therebetween, the at least two silicon elements having an electro-optically active material disposed within the slot, a first of the at least two silicon elements configured as a ground conductor and a second of the at least two silicon elements configured as a signal conductor, the at least two silicon elements configured to apply an electromagnetic field to the electro-optically active material in a first direction, the slotted waveguide configured as a first arm of the Mach-Zehnder interferometer, and a second slotted wave guide having at least two silicon elements defining a slot therebetween, the at least two silicon elements having an electro-optically active material disposed within the slot, a first of the at least two silicon elements configured as a ground conductor and a second of the at least two silicon elements configured as a signal conductor, the at least two silicon elements configured to apply an electromagnetic field to the electro-optically active material in a second direction antiparallel to the first direction, the slotted waveguide configured as a second arm of the Mach-Zehnder interferometer, an optical fiber configured as a second arm of the Mach-Zehnder interferometer; the silicon element of the first slotted wave guide signal configured as a signal conductor and the silicon element of the second slotted wave guide signal configured as a signal conductor being in electrical contact; an optical input port of the Mach-Zehnder interferometer configured to receive an optical carrier signal, the optical input port configured to apply the optical carrier signal to the first arm of the Mach-Zehnder interferometer and to the second arm of the Mach-Zehnder interferometer; an optical output port of the Mach-Zehnder interferometer configured to provide a single-ended optical output signal; and an electrical input port configured to receive an input electrical signal having a radio frequency component with instantaneous amplitude V, and having a driver configured to apply the radio frequency signal component as a data signal relative to a ground signal to the silicon element of the first slotted wave guide signal configured as a signal conductor and to the silicon element of the second slotted wave guide signal configured as a signal conductor of the slotted wave guide, and to apply the ground signal to each of the first of the at least two silicon elements configured as a ground conductor of each of the first and second slotted wave guides; the Mach-Zehnder interferometer configured to provide at the optical output port a single-ended optical signal proportional to 2 times V.

In one embodiment, the input electrical signal is an analog signal.

In another embodiment, the input electrical signal is a digital signal.

In yet another embodiment, the Mach-Zehnder interferometer is configured to operate at a frequency of 10 GHz.

In still another embodiment, the Mach-Zehnder interferometer is configured to operate at a frequency of 20 GHz.

In a further embodiment, the Mach-Zehnder interferometer is configured to operate at a frequency of 50 GHz.

In still a further embodiment, the Mach-Zehnder interferometer further comprises a fiber optic link and a photodetector receiver.

In yet another embodiment, the photodetector receiver comprises a transimpedance amplifier.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A is a schematic diagram of the device geometry (not to scale). In one embodiment, FIG. 1A shows ground 110 and signal 115 bus bars are fabricated in aluminum, the slot waveguide 125 (as indicated in FIG. 1B) is fabricated in silicon, silicon dioxide layer 120 and an electro-optic polymer 105. Various implant concentrations are indicated as imp_c1, imp_c2 and imp_c3, corresponding to different doping densities in different regions of the silicon slot wave guide 125. FIG. 1A also shows the physical relationships among various parameters used to model the SWG. The waveguide geometry is described in Table 1.

FIG. 1B is an inset that shows the whole structure with both arms of the MZI operated in push-pull operation, in which arrows indicate the relative orientation of the E-field during operation.

FIG. 2 is an SEM micrograph of a SWG with a 120 nm slot fabricated with optical lithography at BAE Systems. The slot was purposely defined off center, as it was found that this increases the single mode frequency region.

FIG. 6A is a diagram showing the optical $E_x$ field across the waveguide cross-section shown in the inset shown in FIG. 6B in the extreme case of a 2 nm slot.

FIG. 6B is a diagram showing the optical $E_x$ field across the waveguide cross-section shown in the inset shown in FIG. 6B for a typical realistic device with a 100 nm slot.

FIG. 7A is a diagram showing a comparison of the optical E-fields across SWGs with 2 nm and 100 nm slots. Both modes have been normalized to carry equal flux.

The SWG ridge width, wg_rw, is intrinsically varied with wg_sw in order to maintain optimum slot overlap, for wg_rh=200 nm and wg_ch=50 nm.

Figure 10:
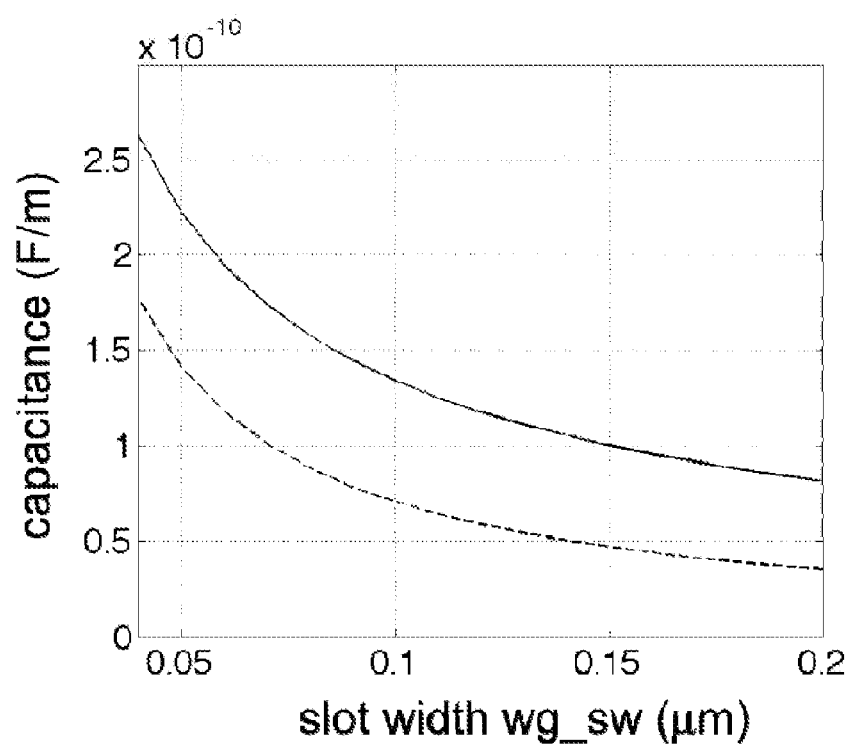
Figure 11A:
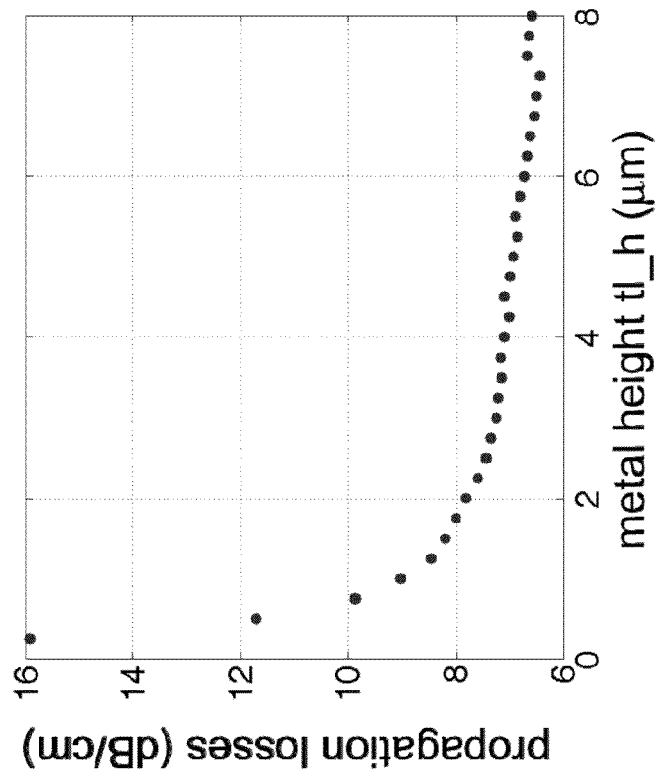
Figure 11B:
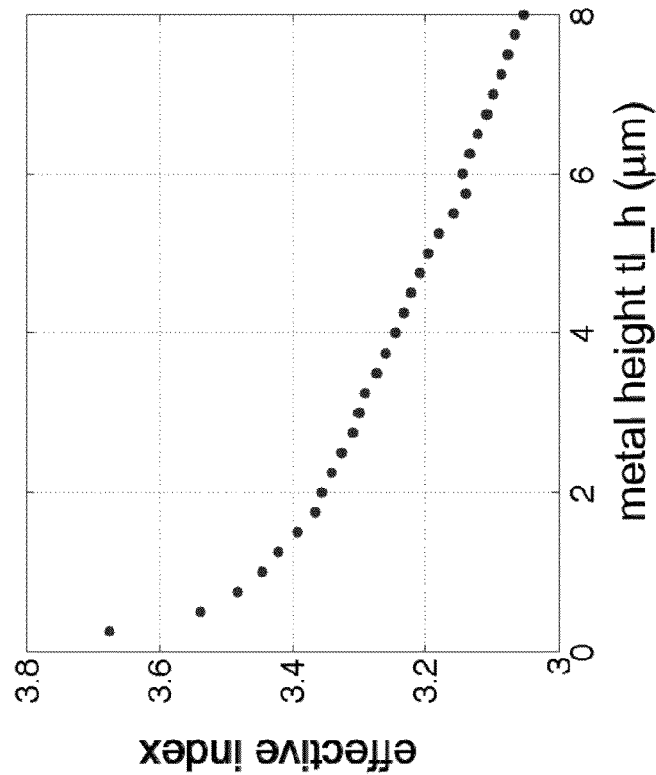
Figure 11D:
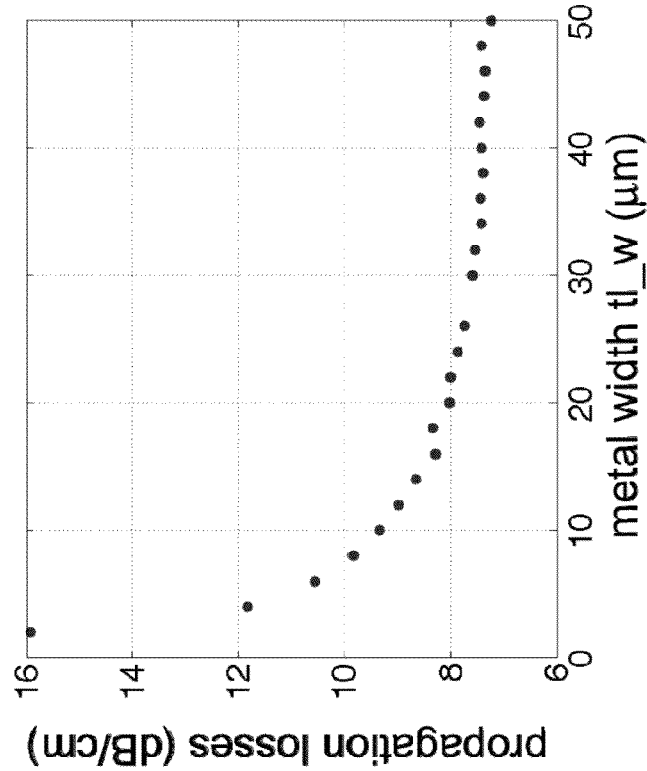
Figure 11C:
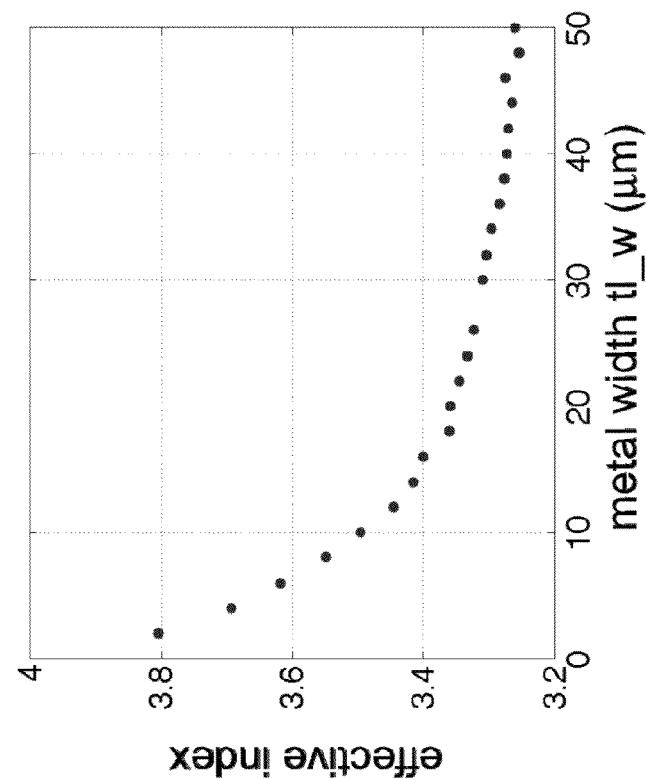
Figure 11E:
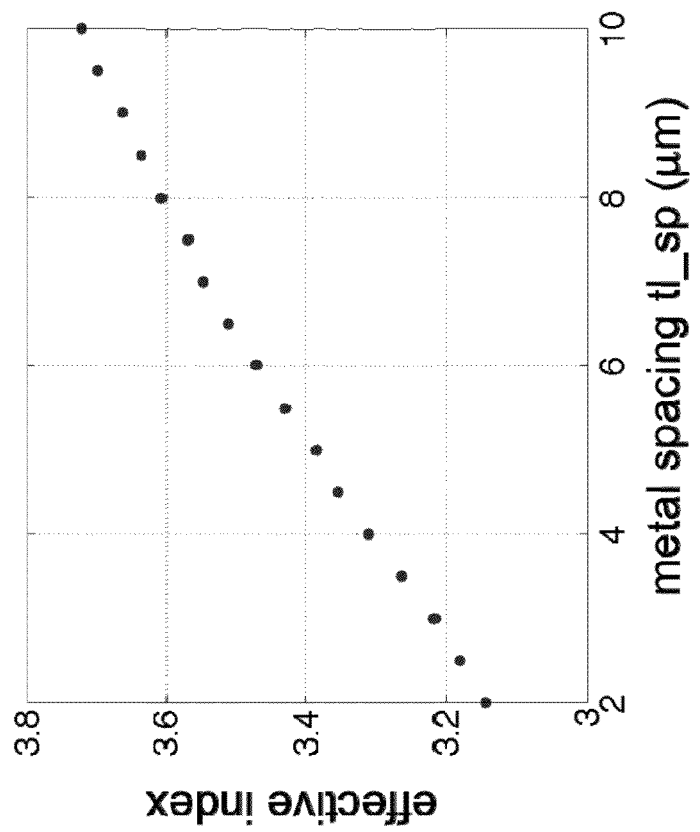

FIG. 10 is a graph showing SWG capacitance as a function of slot width. The continuous line is simulated with PISCES, while the dashed line corresponds to the parallel plate approximation.

FIG. 11A through FIG. 11E illustrate transmission line (TL) effective index and propagation losses as a function of design parameters for metal height, metal width and metal spacing at a frequency of 10 GHz. Each parameter is varied around the geometry given by Table 1. The propagation losses shown here include excess losses from the high and moderate resistivity silicon regions. These curves were obtained by iterative simulations with a finite-elements mode solver.

Figure 12A:
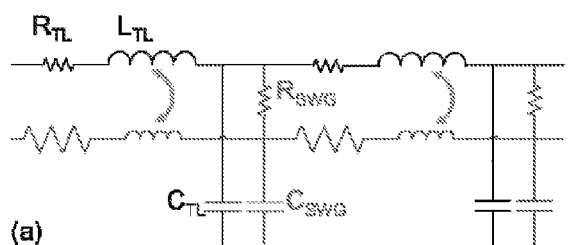

FIG. 12A is an equivalent circuit of the loaded TL. Elements denoted with SWG correspond to the SWG.

Figure 12B:
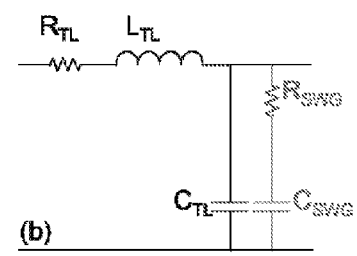

FIG. 12B is a simplified equivalent circuit.

Figure 12C:
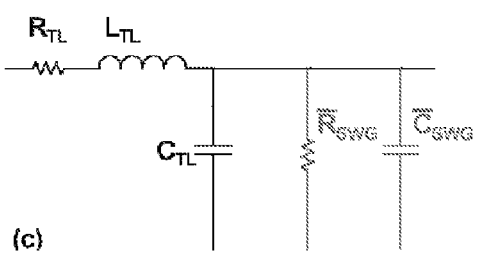

FIG. 12C is a circuit diagram showing the series RC model for the SWG transformed into a parallel model to allow using the standard telegraph line equations.

Figure 13A:
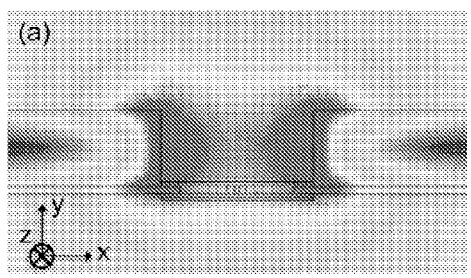

FIG. 13A is a diagram of the RF H-field distribution in a SWG. The scale is 0 to 2e4 A/m. The mode is normalized to carry 1 W of power. The solutions are based on fully vectorial solutions of Maxwell's equations at 10 GHz.

Figure 13B:
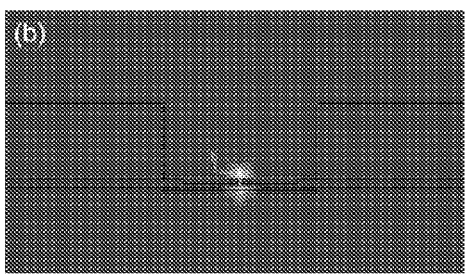

FIG. 13B is a diagram of the RF E-field distribution in a SWG. The scale is 0 to 1.15e8 V/m.

FIG. 14A shows the RF loss volume density, with a scale of 0 to $2.2e15$ W/m$^3$.

FIG. 14B shows the Jz current distribution, with a scale of 0 to 6e10 A/m$^2$.

FIG. 14C shows the) Jx current distribution, with a scale of 0 to 2.5e9 A/m$^2$.

FIG. 14D shows the rescaled Jz current distribution, with a scale of 0 to 1e8 A/m$^2$. The mode is normalized to carry 1 W of power.

FIG. 15A shows the E-field in V/m as a function of geometry for an SWG driven as a lumped element at 10 GHz, i.e., with a homogeneous AC voltage applied along the entire length.

FIG. 15B shows the H-field in A/m for the SWG of FIG. 15A.

Figure 16A:
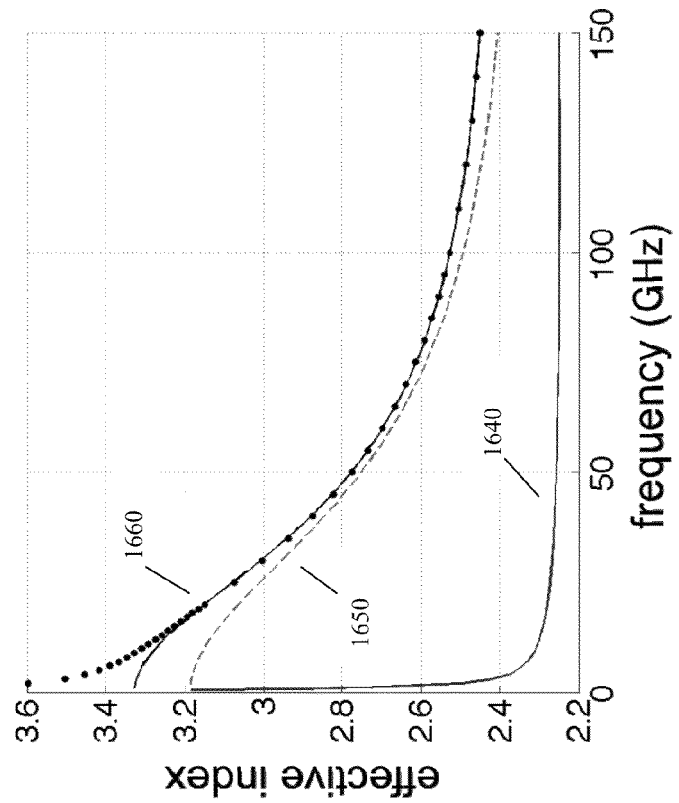

FIG. 16A is a graph showing the real part of the TL impedance as a function of frequency.

Figure 16B:
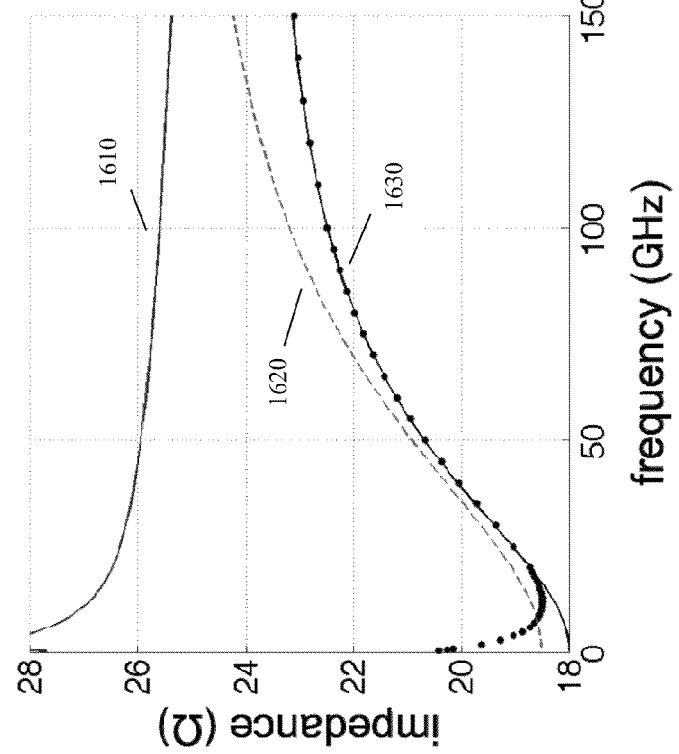

FIG. 16B is a graph showing the real part of the TL effective index as a function of frequency.

In FIG. 16A and FIG. 16B, black dots correspond to simulation data for the loaded TL. The curves 1630, 1660 are fits to the simulation. The curves 1610, 1640 show the simulation results for the unloaded TL (silicon conductance uniformly set to zero). The curves 1620, 1650 correspond to the analytical models described in the text, with independently evaluated values for SWG and TL characteristics applied to the formulas ("independently simulated" column of Table 3).

FIG. 17A is a graph of the TL losses as a function of frequency (continuous curve 1710). The dashed curve shows the transmission losses when the aluminum is replaced by a perfect metal, and corresponds to the excess losses from the silicon. The curve 1730 represents the losses from the unloaded aluminum TL. The curve 1720 corresponds to the analytical model for the excess losses and should be compared to the dashed curve.

FIG. 17B is a detailed view of the lower frequency portion of FIG. 17A.

Figure 18:
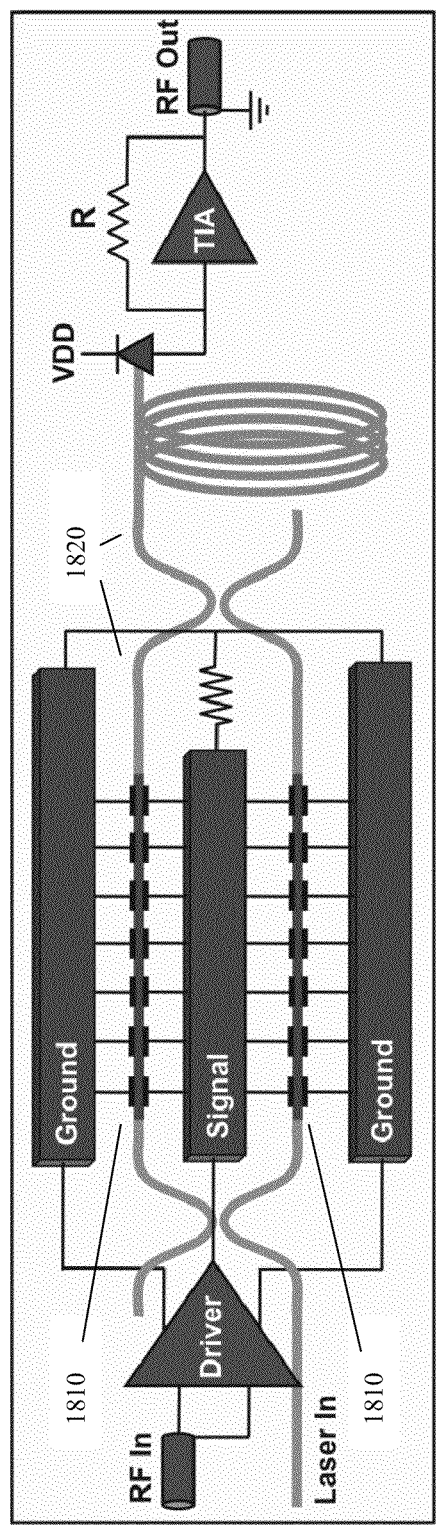

FIG. 18 is a schematic of an optical analog link, showing SWGs 1810 located on chip and regular waveguides 1820 (on-chip) or fibers (off-chip).

Figure 19A:
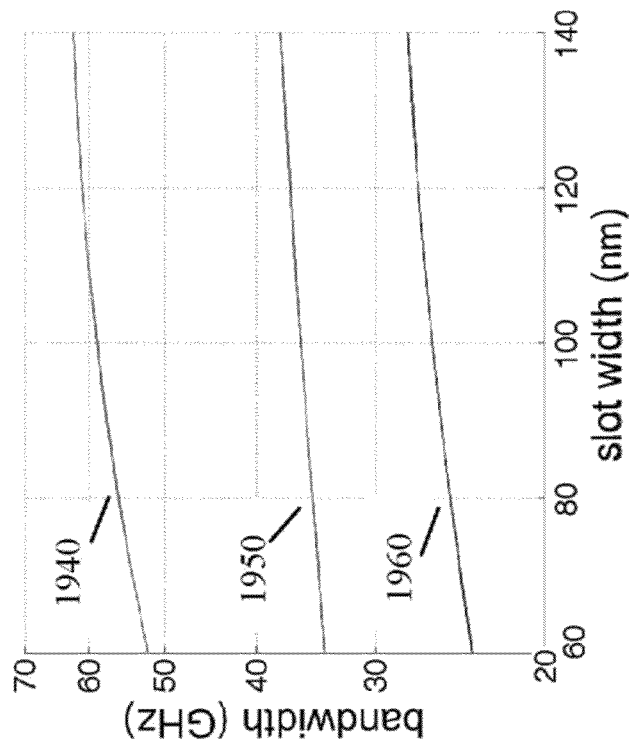

FIG. 19A is a graph showing the value of $V_\pi$ as a function of slot width. The curves 1930, 1920 and 1910 correspond to devices optimized for and operated at 10 GHz, 20 GHz and 50 GHz, respectively. Data points correspond to devices optimized for the operation frequency at which they are reported (in particular, $V_\pi$ is reported at speed).

Figure 19B:
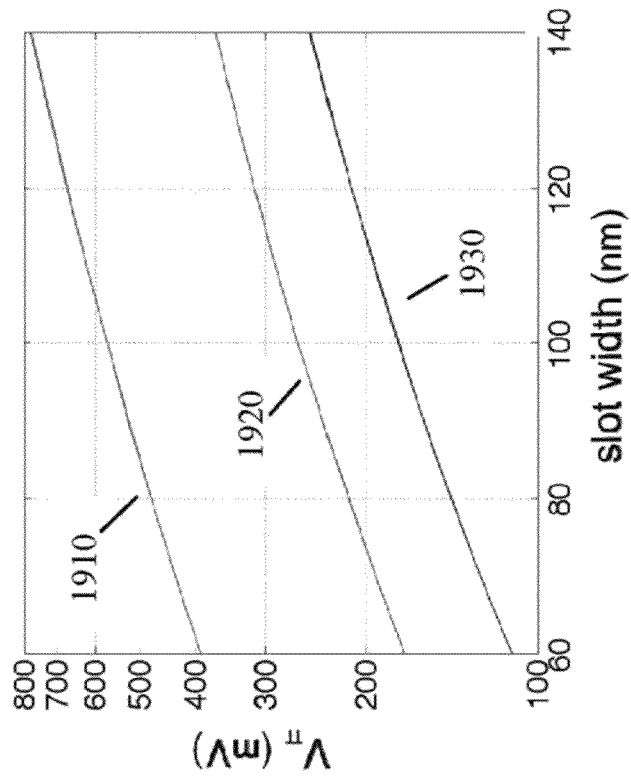

FIG. 19B is a graph showing the value of bandwidth as a function of slot width. The curves 1960, 1950 and 1940 correspond to devices optimized for and operated at 10 GHz, 20 GHz and 50 GHz, respectively. The reported bandwidth is the optical bandwidth of the entire MZI (i.e., $S_{21}$=0.5 or equivalently $V_\pi$ (f)=$2V_\pi$(DC)), including effects of both the SWG bandwidth limitation and the frequency dependent TL losses.

Figures 19C, 19D:
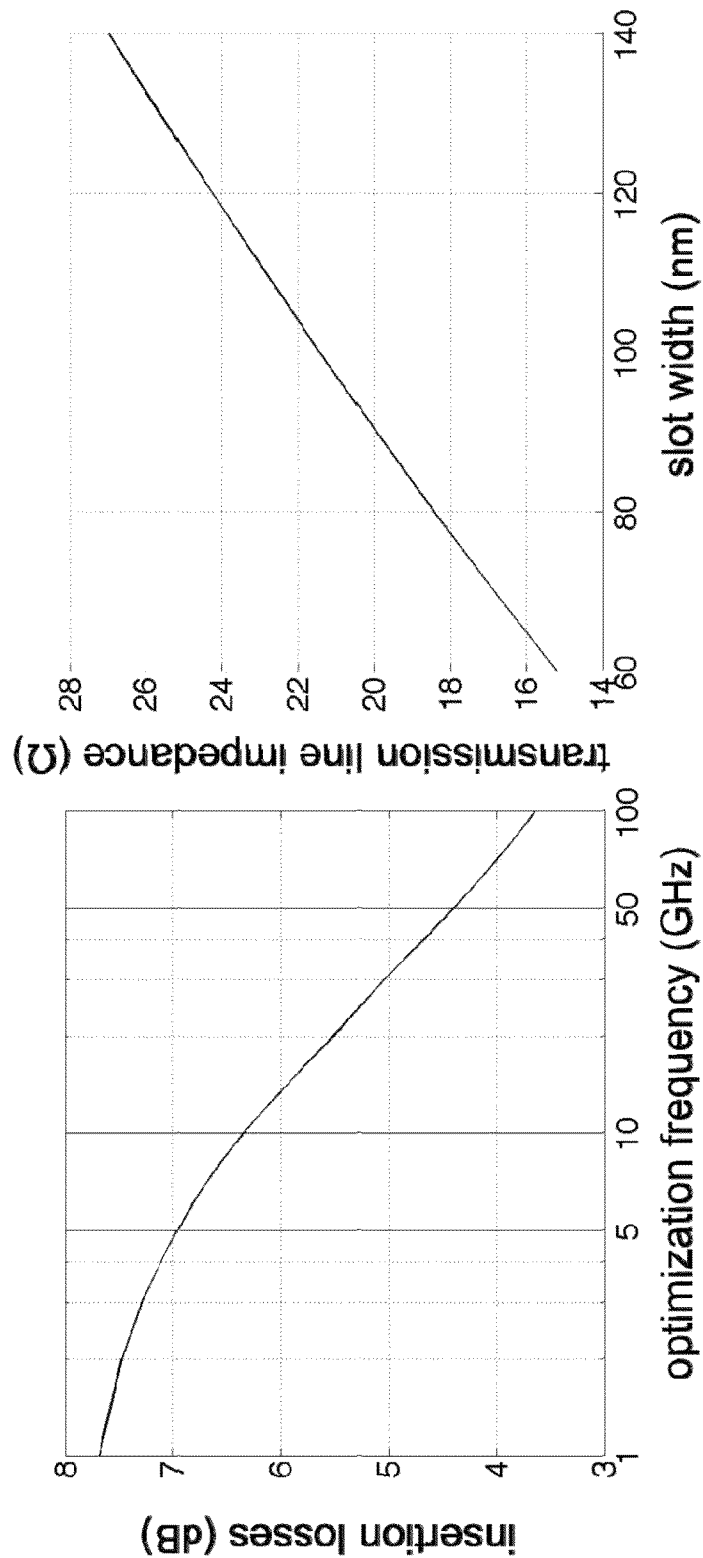

FIG. 19C is a graph showing the insertion losses as a function of optimization frequency for a 100 nm slot. Insertion losses are relatively insensitive to slot width. The insertion losses only take into account implanted SWG losses. Fiber to chip and ridge to SWG coupling losses have to be accounted for separately.

FIG. 19D is a graph showing transmission line impedance as a function of slot width for a 10 GHz frequency. The TL impedance is relatively insensitive to optimization frequency.

Figure 20A:
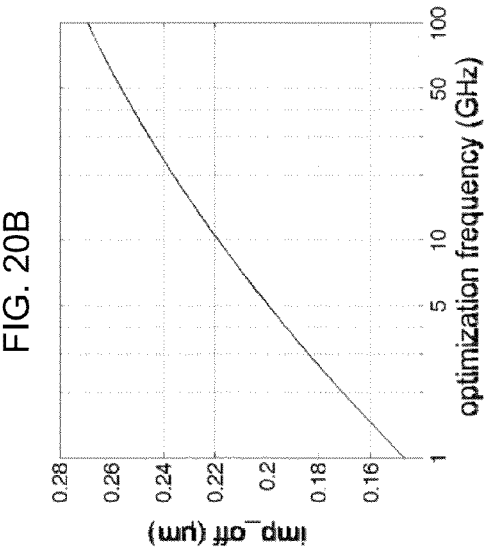

FIG. 20A is a graph showing implant concentration as a function of optimization frequency, assuming a 100 nm slot width. In FIG. 20A, imp_c1 is given by the curve 2020 and imp_c2 by the curve 2010. Optimization was run assuming donor type impurities.

Figure 20B:
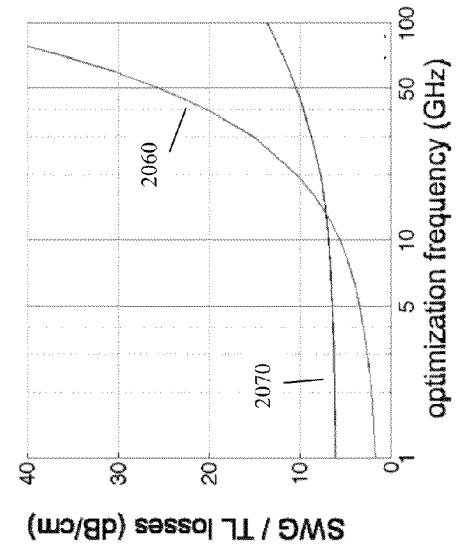

FIG. 20B is a graph of imp_off as a function of optimization frequency.

Figure 20C:
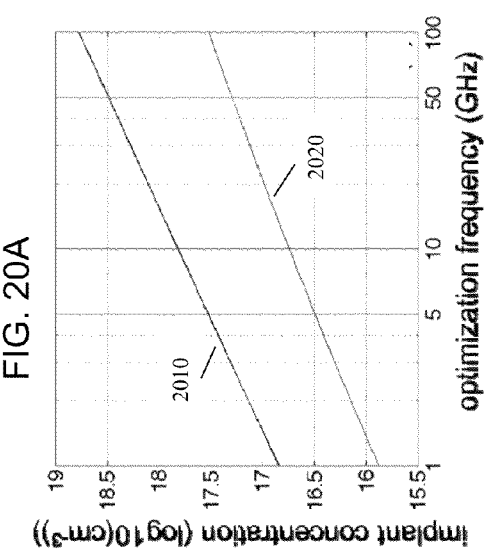

FIG. 20C is a graph of length as a function of optimization frequency in which curve 2050 is the effective length of an infinite TL (this gives an idea of the limit on the MZI length if the insertion losses were heavily neglected relative to drive voltage). Curve 2040 corresponds to the WG decay length. Curve 2030 represents the Mach-Zehnder interferometer length.

Figure 20D:
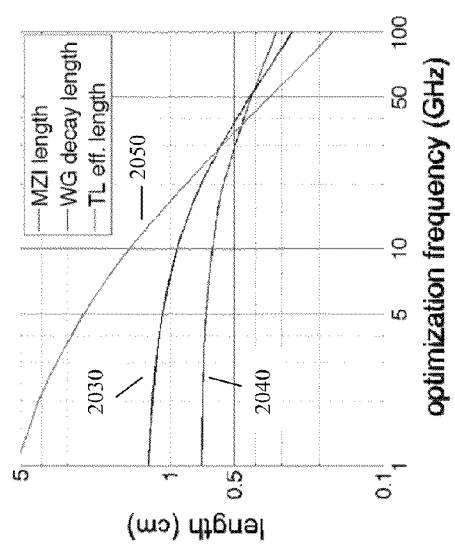

FIG. 20D is a graph of the SWG/TL Losses as a function of optimization frequency. In FIG. 20D curve 2070 corresponds to the SWG loss and curve 2060 corresponds to the TL loss.

Figure 21:
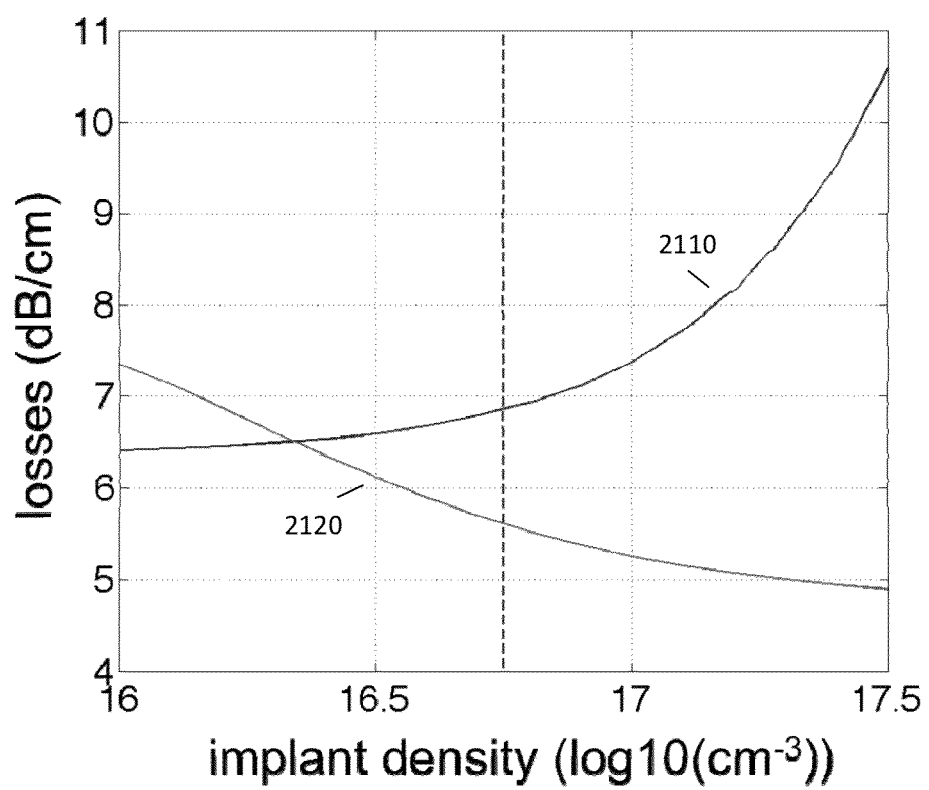

FIG. 21 is a graph showing the TL propagation losses (2120) and the SWG propagation losses (2110) as a function of the lowest density implant concentration when varying around the optimum (dashed line) at 10 GHz.

Figure 22A:
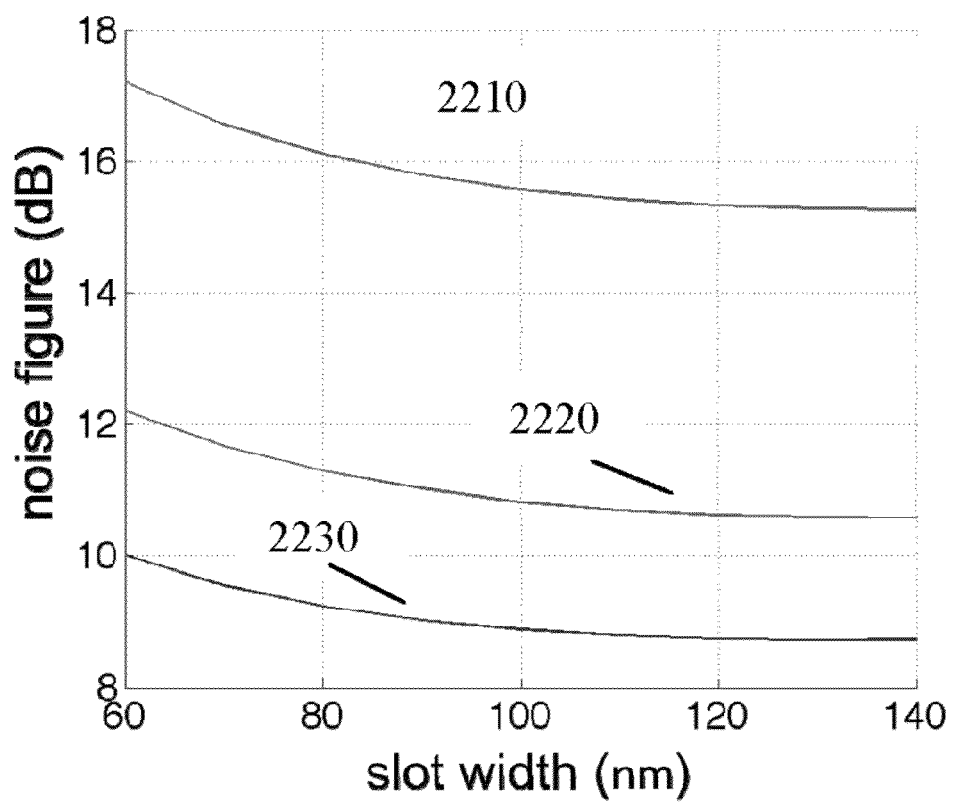

FIG. 22A is a graph of the single ended analog link noise figure (NF) as a function of slot width, assuming $r_{33}$=150 pm/V and a polymer optical power density equivalent to launching 15 mW into each of the two SWG branches of the MZI when the slot is equal to 100 nm. The curves 2230, 2220 and 2210 correspond to devices optimized for and operated at 10 GHz, 20 GHz and 50 GHz, respectively.

FIG. 22B is a graph of the single ended analog link NF as a function of optical power launched into each of the two SWG branches of the MZI assuming $r_{33}$=150 pm/V and a 100 nm slot. The curves 2260, 2250 and 2240 correspond to devices optimized for and operated at 10 GHz, 20 GHz and 50 GHz, respectively. The dashed curves correspond to the NF assuming a perfect, noiseless receiver.

FIG. 22C is a graph of the dual fiber analog link NF as a function of optical power launched into each of the two SWG branches of the MZI assuming $r_{33}$=150 pm/V and a 100 nm slot. The complementary outputs of the MZI are assumed to be sent into a balanced receiver. The curves 2290, 2280 and 2270 correspond to devices optimized for and operated at 10 GHz, 20 GHz and 50 GHz, respectively. The dashed curves correspond to the NF assuming a perfect, noiseless receiver.

Figures 23A, 23B:
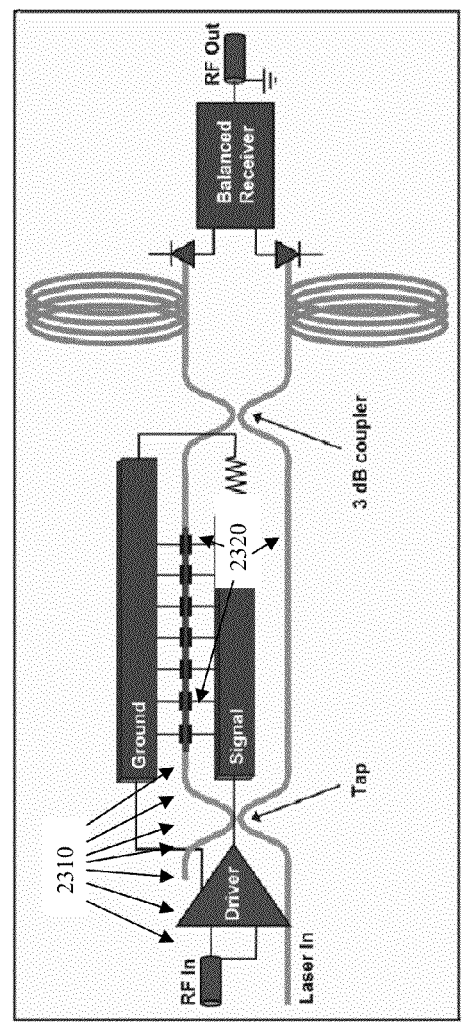

FIG. 23A is a schematic diagram of a balanced receiver analog link with homodyne signal amplification at the transmitter and showing the inputs $P_{sig}$ and $P_{amp}$, and the output signals generated. The laser power is split with an asymmetric tap to send $P_{sig}$ into the SWG and $P_{amp}$ into the other branch.

FIG. 23B is a schematic showing the SWGs 2310 and conventional waveguides or fibers 2320. The laser power is split with an asymmetric tap to send $P_{sig}$ into the SWG and $P_{amp}$ into the other branch. Biasing of the modulator at the 3 dB point is intrinsically assumed (control system or waveguide delay not shown).

FIG. 24A is a graph showing the noise figure (NF) of a balanced link with homodyne amplification transmission with $P_{amp}$=20 mW. Curves 2430, 2420 and 2410 are for devices optimized for and operated at 10 GHz, 20 GHz and 50 GHz respectively. The dashed curves correspond to the NF assuming a perfect, noiseless receiver.

FIG. 24B is a graph showing the noise figure (NF) of a balanced link with homodyne amplification transmission with $P_{amp}$=100 mW. Curves 2460, 2450 and 2440 are for devices optimized for and operated at 10 GHz, 20 GHz and 50 GHz respectively. The dashed curves correspond to the NF assuming a perfect, noiseless receiver.

Figure 24C:
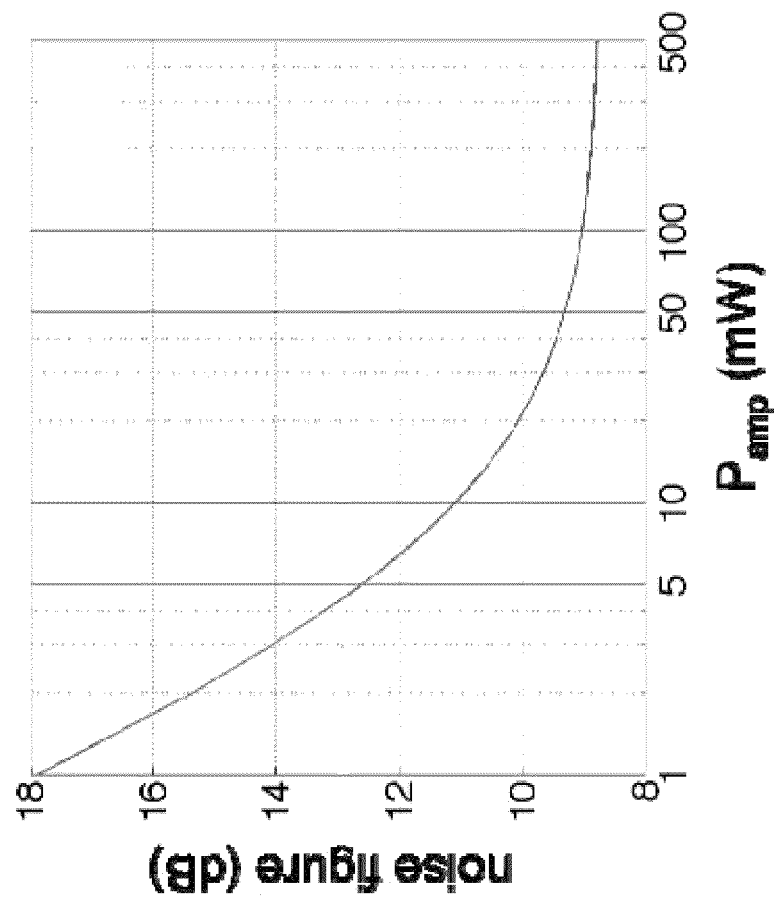

FIG. 24C is a graph showing the NF as a function of $P_{amp}$ for $P_{sig}$=3 mW and for a device optimized for and operated at 20 GHz.

DETAILED DESCRIPTION

Slot waveguides allow joint confinement of the driving electrical radio frequency field and of the optical waveguide mode in a narrow slot, allowing for highly efficient polymer based interferometers. A discussion of slot waveguides and how they are fabricated is given in U.S. Pat. No. 7,200,308, which is incorporated herein by reference in its entirety. We show that the optical confinement can be simply explained by a perturbation theoretical approach taking into account the continuity of the electric displacement field. We present a design for phase matched transmission lines and show that their impedance and RF losses can be modeled by an equivalent circuit and linked to slot waveguide properties by a simple set of equations, thus allowing optimization of the device without iterative simulations. We optimize the interferometers for analog optical links and predict record performance metrics ($V_\pi$=200 mV @ 10 GHz in push-pull configuration) assuming a modest second order nonlinear coefficient ($r_{33}$=50 pm/V) and slot width (100 nm). Using high performance optical polymers ($r_{33}$=150 pm/V), noise figures of state of the art analog optical links can be matched while reducing optical power levels by approximately 30 times. With required optical laser power levels predicted at 50 mW, this could be a game changing improvement by bringing high performance optical analog link power requirements in the reach of laser diodes. A modified transmitter architecture allows shot noise limited performance, while reducing power levels in the slot waveguides and enhancing reliability.

Designs for SWG based Mach-Zehnder interferometers (MZI) with phase matched transmission lines (TL) are described, in which there are long interaction lengths between the RF signal and the SWG ($l >> \lambda_{RF}/4$). One of the fundamental trade-offs resides in the doping concentrations. Higher doping leads to higher waveguide losses, but also to lower waveguide series resistance and thus to smaller TL losses and to a reduced $V_\pi$. By increasing doping concentrations relative to the devices described in the literature, SWG based modulators with a bandwidth of 1 GHz have recently been demonstrated. By using dual concentration implants and higher resistivity substrates as described in this paper, it is predicted that much higher bandwidths will be attained. In order to model and to optimize the devices, the waveguides are first independently characterized in terms of their geometry and implantation profile. Relevant SWG characteristics are optical overlap with the slot, group index, absorption losses, capacitance and series resistance. A TL is then designed for a typical waveguide geometry by using a finite-elements solver for Maxwell's equations in the RF domain (HFSS). Based on the TL mode profile, an equivalent lumped element circuit is proposed for infinitesimal TL segments. Predictive formulas relating phase matched TL characteristics (impedance and RF propagation losses) to waveguide characteristics (group index, linear capacitance and series resistance) are derived from the equivalent circuit and verified against finite-elements simulation results. These models are then used to optimize an MZI with a figure of merit (FOM) maximizing analog link performance. While sections 3.1 and 4.2-4.4 contain most of the novel device physics, sections 3.2 and 4.1 contain detailed data that the reader will find useful to reproduce these results and design similar devices. Section 5 is dedicated to the high-level performance metrics, both for the bare modulators and for the analog optical links. All numerical values are reported assuming an operating wavelength of 1550 nm.

Device Overview

FIG. 1 shows a cross-section of a slot waveguide (SWG) and of half the transmission line (TL). The complete TL is a coplanar line of the form Ground-Signal-Ground (GSG) that applies a push-pull signal to the two arms of the Mach-Zehnder Interferometer (MZI), assuming the polymers are poled in the same direction in both slots. In this discussion, $V_\pi$ is the value for the MZI operated in push-pull configuration, i.e., it is the aggregate effect of both arms. In addition to defining the geometry, FIG. 1 also defines three implant regions, having low, moderate and high density implants, respectively, and designated imp_c1, imp_c2 and imp_c3. Table 1 summarizes numerical values for the design parameters shown in FIG. 1A.

TABLE 1

| Name | Description | Transmission Line Design | Optimized MZI for operation at 10 GHz |
|---|---|---|---|
| wg_rh | SWG ridge height | 200 nm | 200 nm |
| wg_ch | SWG cladding height | 50 nm | 50 nm |
| wg_rw | SWG ridge width | 442 nm | 442 nm |
| wg_sw | SWG slot width | 100 nm | 100 nm |
| wg_excl | SWG exclusion region | 1.25 µm | 1.25 µm |
| imp_off | Implant offset: Dist. between edge of waveguide and onset of moderate implants | 277 nm | 174 nm |
| imp_c1 | Low implant density (donor) | $5.5e16\ cm^{-3}$ | $5.6e16\ cm^{-3}$ |
| imp_c2 | Moderate implant density (donor) | $8e17\ cm^{-3}$ | $6.7e17\ cm^{-3}$ |
| imp_c3 | High implant density (donor) | $1e20\ cm^{-3}$ | $1e20\ cm^{-3}$ |
| tl_h | TL height | 2 µm | NA |
| tl_w | TL width | 30 µm | NA |
| tl_sp | TL spacing | 4 µm | NA |
| length | Modulator length | NA | 9 mm |

In a preferred embodiment, the devices are fabricated in silicon-on-insulator (SOI) wafers. Not shown in FIG. 1 are the buried oxide (BOX) thickness and the silicon wafer handle. In order to suppress optical coupling from the waveguides to the silicon handle, the BOX advantageously is taken to be 3 µm in the remainder of this description. In order to avoid transmission line losses associated to currents in the silicon handle, it should be made out of high resistivity silicon. In some embodiments, the silicon handle is assumed to have a resistance of 100Ω×cm. FIG. 18 presents a complete device schematic. The narrow slots are the most challenging aspect of SWG fabrication. However, advances in resist shrinking methods allow fabricating very narrow slots, even with optical lithography. FIG. 2 shows an SEM micrograph of a 120 nm slot SWG fabricated with optical lithography.

Waveguide Properties

We now describe the modeling of the stand alone, implanted waveguides. Then we describe the overlap of the optical field with the electrical RF driving field. Thereafter we focus on secondary metrics, such as implant induced optical losses, series resistance and capacitance.

Overlap of Optical and Electric Fields

Figures 3A, 3B:
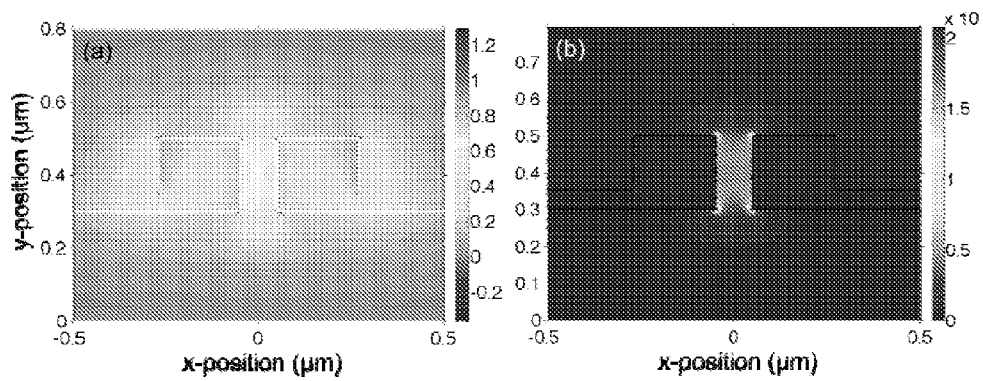
FIG. 3A is a diagram illustrating the optical $E_x$ field distribution in arbitrary units (a.u.) for a transverse electric (x-polarized) mode.
FIG. 3B is a diagram illustrating the RF $E_x$ field distribution a transverse electric (x-polarized) mode. The very high E-field regions at the corners are artifacts of the finite-elements mode solver.

A strength of SWGs lies in the fact that the optical field is confined is a small volume (the slot) filled with polymer as shown in FIG. 3A. Since the RF voltage can be entirely dropped across the same region, as shown in FIG. 3B, the resulting RF electrical field strength is very high relative to what would be obtained with wider cross-section modes.

Figure 4A:
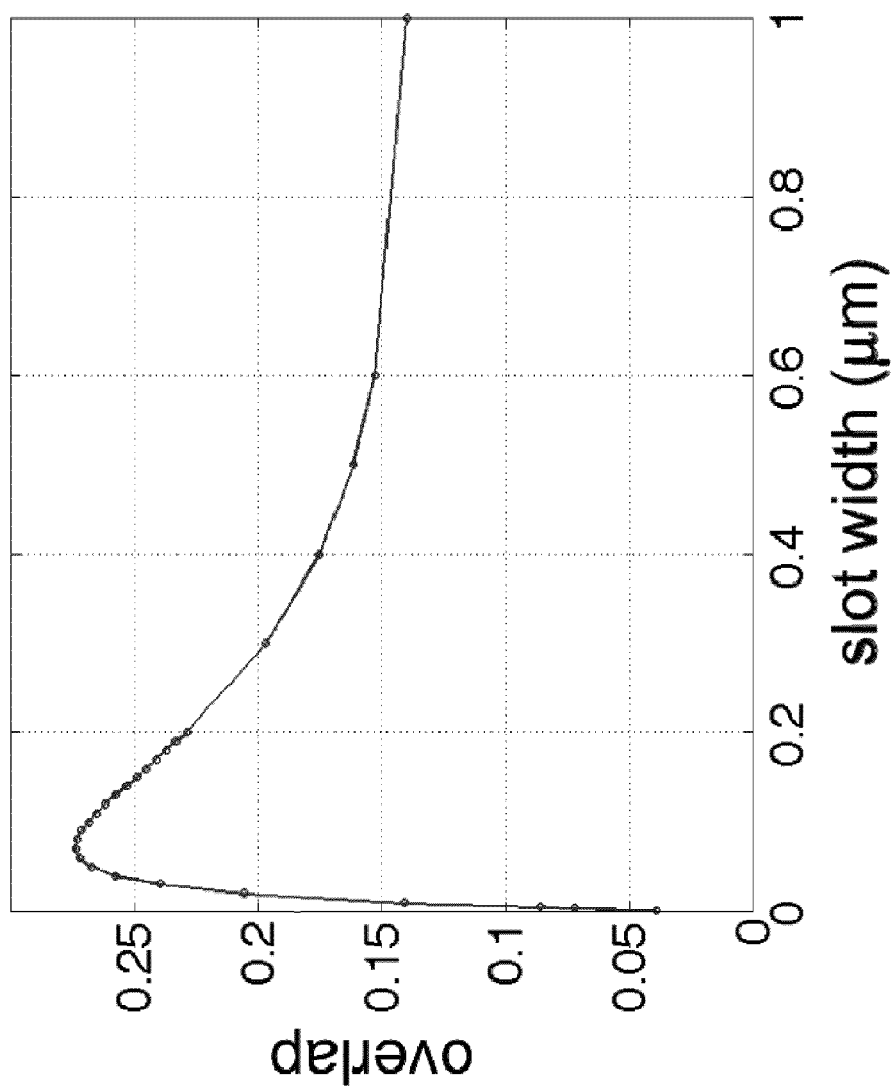
FIG. 4A is a graph illustrating the optical field overlap with the slot region as a function of slot width
Figure 4B:
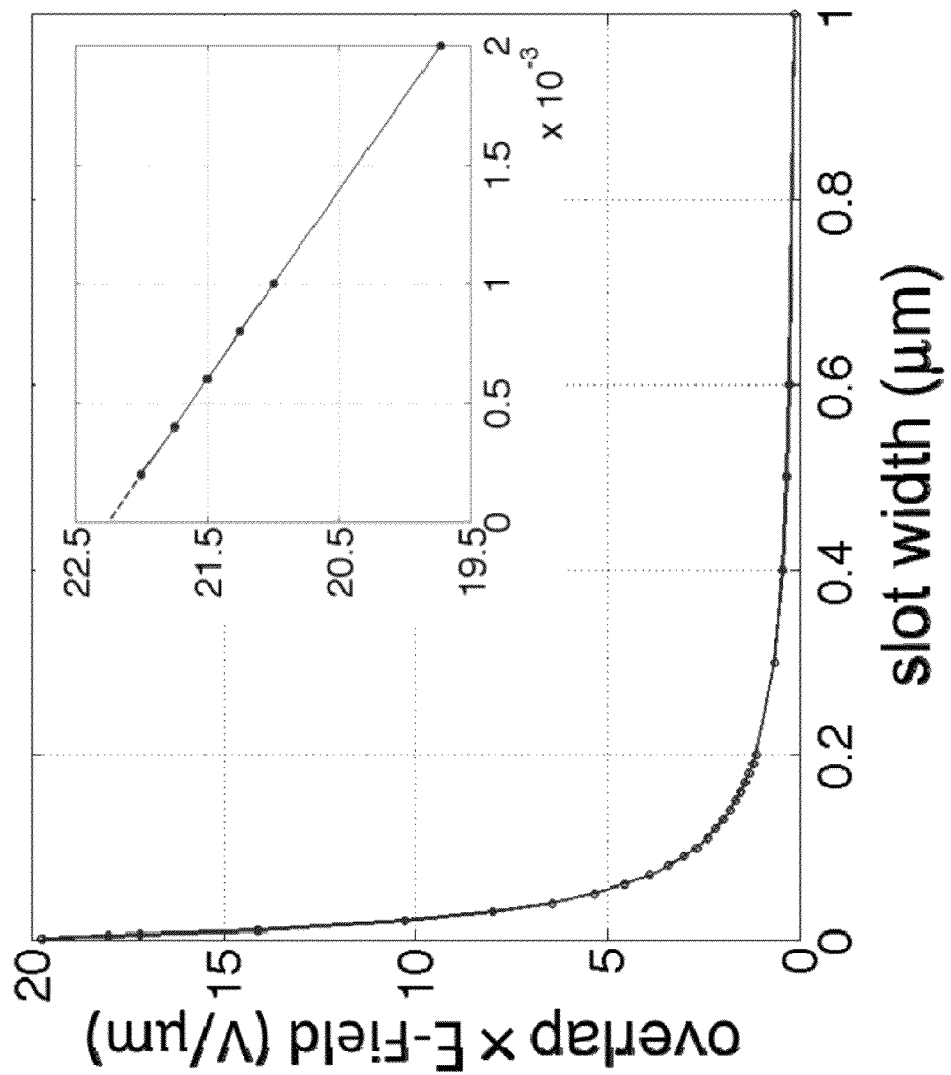
FIG. 4B is a graph illustrating the overlap multiplied by the $E_x$ RF field strength for an applied bias of 1V. wg_rh=200 nm and wg_ch=50 nm. wg_rw is adjusted to maintain optimum overlap (see FIG. 5). The inset shows that the FOM in FIG. 4B converges to a finite value.
Figure 5:
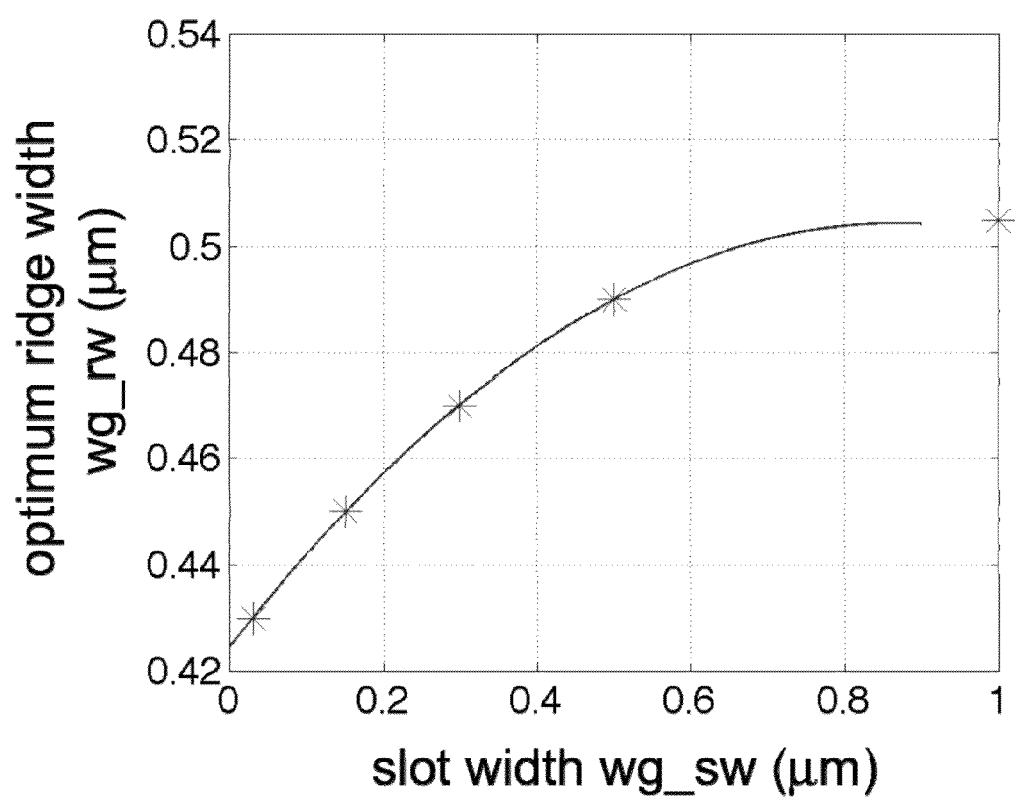
FIG. 5 is a graph showing the optimum ridge width as a function of slot width.

FIG. 4A shows the overlap of the optical field with the slot. FIG. 4B shows the optical overlap multiplied by the RF field strength (assuming a 1V bias), the actual figure of merit for modulation. Interestingly, the FOM keeps growing for smaller slots, down to the smallest slot simulated (0.2 nm). It is recognized that there will be other limitations in practice such as fabrication, excessive capacitance (which scales as the inverse of the slot width), and dielectric breakdown of the polymer under excessive field strengths. High dielectric strengths in excess of 1.5 MV/cm have been demonstrated. However there have been no reliability studies done under continuous exposure to such extreme fields. High capacitance makes phase matching more challenging and leads to higher TL losses, as is discussed hereinbelow. Finally, small slot widths lead to higher optical power densities that might reduce device lifetime. In the following discussion, 100 nm slots are considered a safe practical dimension, since we have already realized high-quality 100 nm slots with optical lithography and since RF electrical field strengths are below 20 kV/cm (assuming a $V_\pi$ of 200 mV). The data shown in FIG. 4B can be described in intuitive terms by inverting it: A FOM of 20 $\mu m^{-1}$ is the equivalent of perfectly confining the optical field inside a parallel plate capacitor with plate to plate spacing of 50 nm. The FOM for a 100 nm slot is almost an order of magnitude lower, at 2.7 $\mu m^{-1}$, equivalent to a perfect field confinement between two plates spaced by 370 nm. FIG. 5 shows the ridge width wg_rw optimized for highest slot overlap as a function of slot width wg_sw. It can be fitted as $$wg\_rw = -0.1052\ wg\_sw^2 + 0.1831\ wg\_sw + 0.4247,$$

where all dimensions are in $\mu m$.

Interestingly, even though a cursory visual inspection of FIG. 4B could lead to the erroneous conclusion that the theoretical FOM diverges for vanishing slot size, it actually converges to a finite value easily predictable by perturbation theory. By applying the parallel plate approximation to the two internal waveguide edges defining the slot, it can be easily understood how the RF field is confined in the slot region. The high optical field in the slot region is a consequence of the continuity of the normal electric displacement field at the silicon-slot interface.

FIG. 6A shows the electrical field across a SWG with a very narrow slot (2 nm). It can be verified that outside the slot region, the field converges to exactly the profile of a slot-less ridge waveguide of identical dimensions. In order to maintain continuity of the normal D-field, the E-field is multiplied by $\in_{silicon}/\in_{polymer} = n_{silicon}^2/n_{polymer}^2$ inside the slot, where $\in_{silicon}$ and $\in_{polymer}$ are the dielectric constants of silicon and of the polymer and where $n_{silicon}$ and $n_{polymer}$ are the refractive indices of silicon (3.43) and of the electro-optic polymer (~1.7 at optical frequencies). The overlap integral is given by $$Ov = \frac{\int_{slot} n|E_x|^2\,dx\,dy}{Z_0 \int Re(E \times H^*)\,dx\,dy} \quad (1)$$

where $Z_0$ is the impedance of free space. The waveguide effective index change is related to the overlap by $$dn_{eff} = Ov \cdot dn_{polymer} = Ov \cdot r_{33} n_{polymer}^3 E_{RF}/2 = Ov \cdot r_{33} n_{polymer}^3 V_{RF}/(2 \cdot wg\_sw).$$

The numerator of the overlap integral only takes into account $E_x$, since it is the optical E-field component aligned to the RF field. For the SWG geometries described here, this is accurate within 2% relative to the general equation taking into account all the components of the RF and optical E-fields. For ultra-thin slots, the FOM=Ov/wg_sw then takes the form $$\frac{Ov}{wg\_sw} = \frac{\int_{x=0} n|E_x|^2\,dy}{Z_0 \int Re(E \times H^*)\,dx\,dy} = \frac{n_{silicon}^3}{n_{polymer}^3} \frac{\int_{x=0} n_{silicon}|\bar{E}_x|^2\,dy}{Z_0 \int Re(\bar{E} \times \bar{H}^*)\,dx\,dy} \quad (2)$$

where $\bar{E}$ and $\bar{H}$ are the fields of the equivalent, slot-less waveguide. In other words, the FOM corresponds to the number computed based on the slot-less waveguide field, boosted by $n_{silicon}^3/n_{polymer}^3$. It should be noted that the enhancement takes the form of the third order of the index ratio rather than the fourth order because one term $n_{silicon}/n_{polymer}$ is captured within the integral. Hence the index contrast is of paramount importance. This number was calculated to be 22.5 $\mu m^{-1}$. It can be seen in FIG. 4B that this is indeed the value the FOM converges to for vanishing slot width.

FIG. 7A gives some insight into why the FOM drops so quickly for increasing slot width. The field inside the silicon rapidly diverges from the field of the slot-less waveguide, with field maxima moving away from the slot surface into the core of the two silicon regions and resembling the field distribution expected of two coupled waveguides cores, even though this SWG remains single mode. This results in a decrease of the optical field strength at the edges of the slot for a given maximum field in the silicon ($max(E_{Si})$). This weakening of the surface E-field can be quantified by introducing the parameter $\phi$, as defined in FIG. 7A. The decrease of the surface field is further worsened by reduction of $max(E_{Si})$ itself. This is caused by the fact that the increased flux carried by the widened slot region has to be compensated by a reduction of the flux in the rest of the waveguide after field normalization.

Figure 7B:
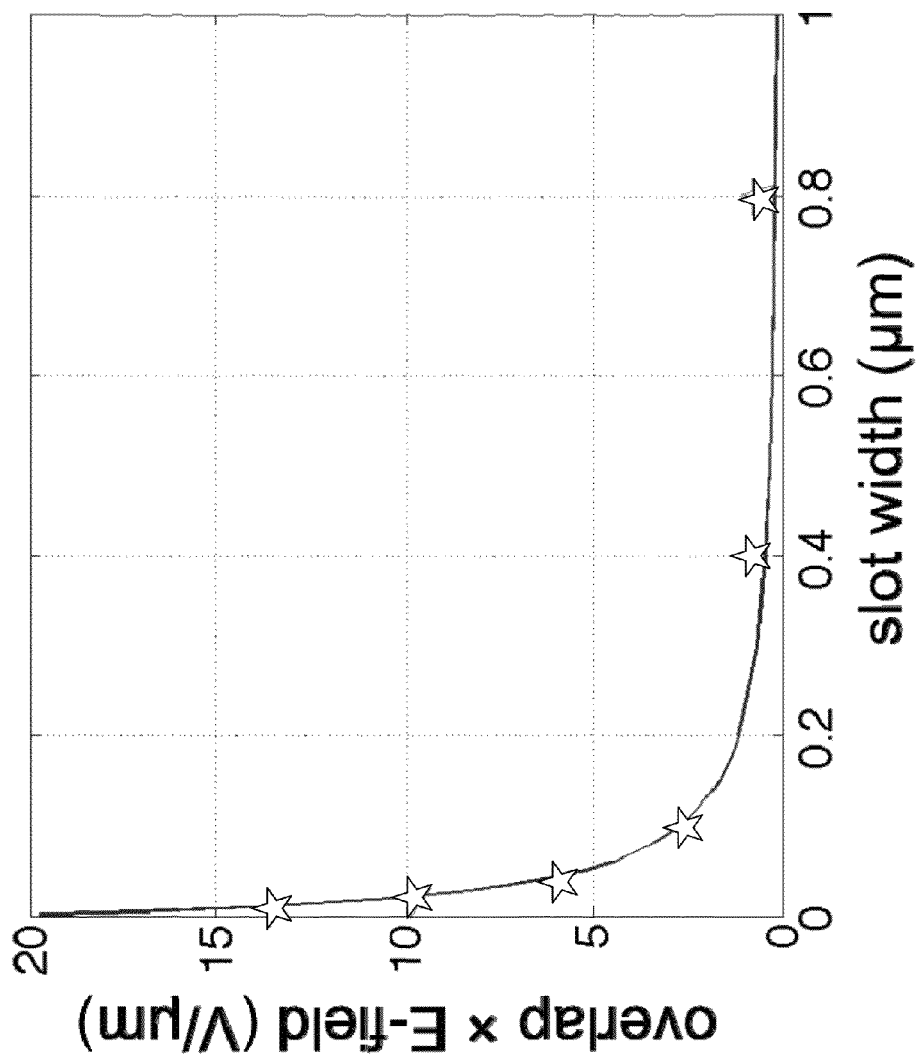
FIG. 7B is a diagram showing a comparison between the simulated figure of merit (line) and the semi-analytical model (stars), showing good agreement.

FIG. 7B compares the simulated FOM to $K \times max(E_{Si})^2 \times cos(\phi)^2$, where K is a normalization constant and $max(E_{Si})$ and $\phi$ were extracted from the field profiles.

The parameter $\phi$ can be predicted by a semi-analytical model. We define $n_{eff}$ as the effective index of the waveguide, $n_{slab}$ as the effective index of the unetched silicon slab (of thickness wg_rh and clad by oxide on one side and polymer on the other, like the waveguide), $\alpha$ as the decay coefficient of the evanescent field inside the slot, $\beta$ as the wave number of the waveguide. If one approximates the field inside the silicon waveguide cores as $max(E_{Si}) \times cos(k(x-wg\_sw/2)+\phi) \times cos(ly+\theta)$ by $$\alpha = \sqrt{n_{eff}^2 + (n_{Si}^2 - n_{slab}^2) - n_{polymer}^2} \frac{2\pi}{\lambda} \quad (3)$$

$$\beta = n_{eff} \frac{2\pi}{\lambda} \quad (4)$$

$$k = \sqrt{n_{slab}^2 - n_{eff}^2} \frac{2\pi}{\lambda} \quad (5)$$

$\nabla \cdot E = 0$ leads to $ikE_x = -i\beta E_z$ in the silicon core regions and $ikE_x = \alpha E_z$ in the slot regions.

The continuity equations at the slot silicon interface then lead to $$\varphi = \arctan\left(\frac{\alpha}{k} \tanh\left(\alpha \frac{wg\_sw}{2}\right) \frac{n_{Si}^2}{n_{polymer}^2}\right) \quad (6)$$

Figure 8:
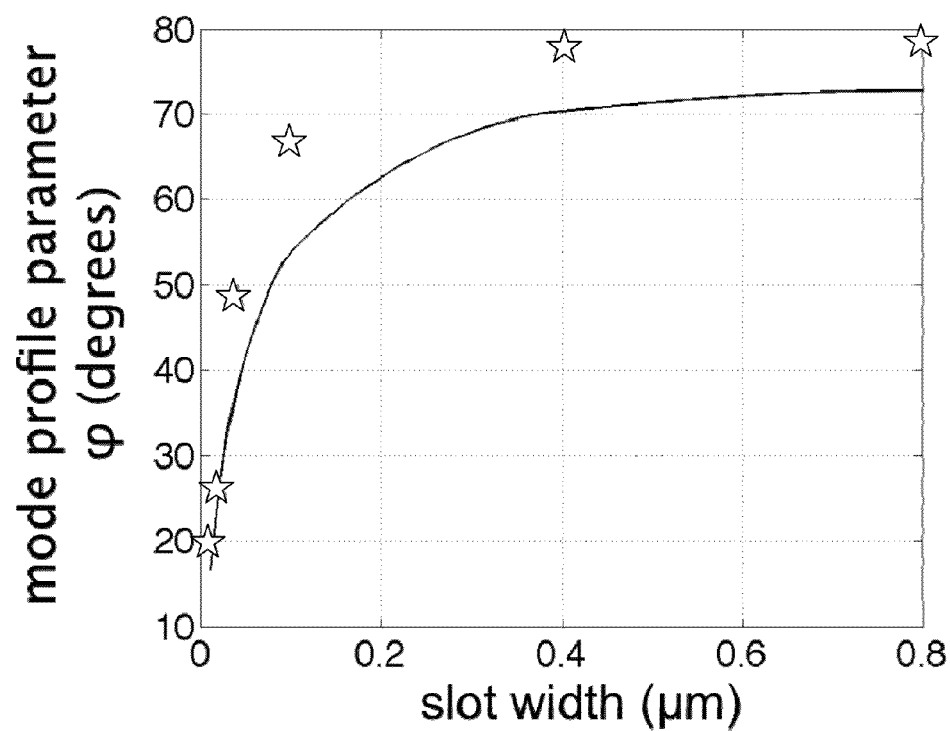
FIG. 8 is a diagram showing the parameter φ as a function of slot width as extracted from mode profiles (line) and as predicted with eq. 6.

FIG. 8 compares $\varphi$ as predicted by eq. 6 to the value extracted from simulated mode profiles. The rapid increase of $\varphi$ with slot width accounts for about half the reduction of the overlap field-strength product, with the other half accounted for by the reduction of max($E_{Si}$).

Decreasing the slot width is not the only method allowing an increase of the slot overlap. A thicker silicon film, or equivalently larger ridge heights (wg_rh), result in higher overlaps as shown in Table 2. This is due to the fact that for thicker silicon films and a fixed wg_ch, the width of the silicon waveguide cores wg_rw can be reduced while maintaining good field confinement inside the waveguide, so that the slot makes up for a larger portion of the entire waveguide. It should also be noted that the overlap is very sensitive to lateral confinement driven by the cladding height wg_ch. While the overlap field-strength product can be increased by either a higher ridge height and thinner ridge width (increasing the overlap) or a thinner slot width (increasing the field strength), the two methods fundamentally differ in some aspects. Both result in increased SWG capacitance, but reducing the slot width also increases the optical power density inside the slot and is thus ultimately reliability limited, while increasing the ridge height reduces the power densities, as discussed hereinbelow. Nonetheless, the analysis in this paper focuses on 200 nm silicon, since this was our process development focus at the time of publication.

TABLE 2

| wg_rh [nm] | wg_ch [nm] | wg sw 100[nm] | | wg sw 140[nm] | |
|---|---|---|---|---|---|
| | | Overlap | wg_rw [nm] | Overlap | wg_rw [nm] |
| 200 | 50 | 0.273 | 443 | 0.255 | 448 |
| 200 | 75 | 0.194 | 493 | 0.168 | 508 |
| 200 | 100 | 0.121 | 568 | 0.098 | 588 |
| 300 | 50 | 0.371 | 397 | 0.352 | 399 |
| 300 | 75 | 0.288 | 435 | 0.255 | 446 |
| 300 | 100 | 0.207 | 488 | 0.171 | 506 |
| 400 | 50 | 0.427 | 371 | 0.393 | 349 |
| 400 | 75 | 0.343 | 404 | 0.289 | 390 |
| 400 | 100 | 0.257 | 453 | 0.204 | 456 |

Optical Losses, Resistance and Capacitance

In order to optimize the MZI, several other waveguide characteristics have to be parameterized, including implant induced SWG losses, SWG capacitance and series resistance.

Figures 9A, 9B:
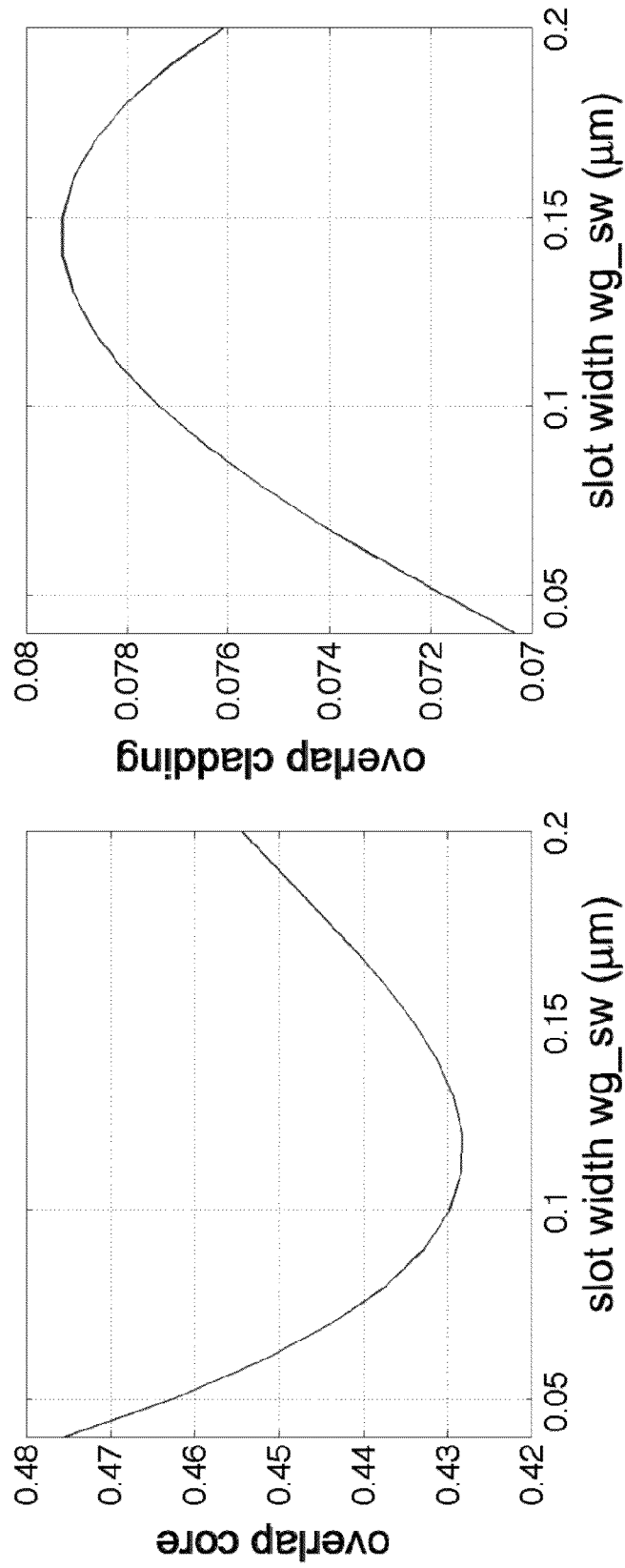
FIG. 9A is a graph illustrating the overlap of the optical field with the core silicon as a function of slot width.
FIG. 9B is a graph illustrating the overlap of the optical field with the cladding silicon as a function of slot width.
Figure 9C:
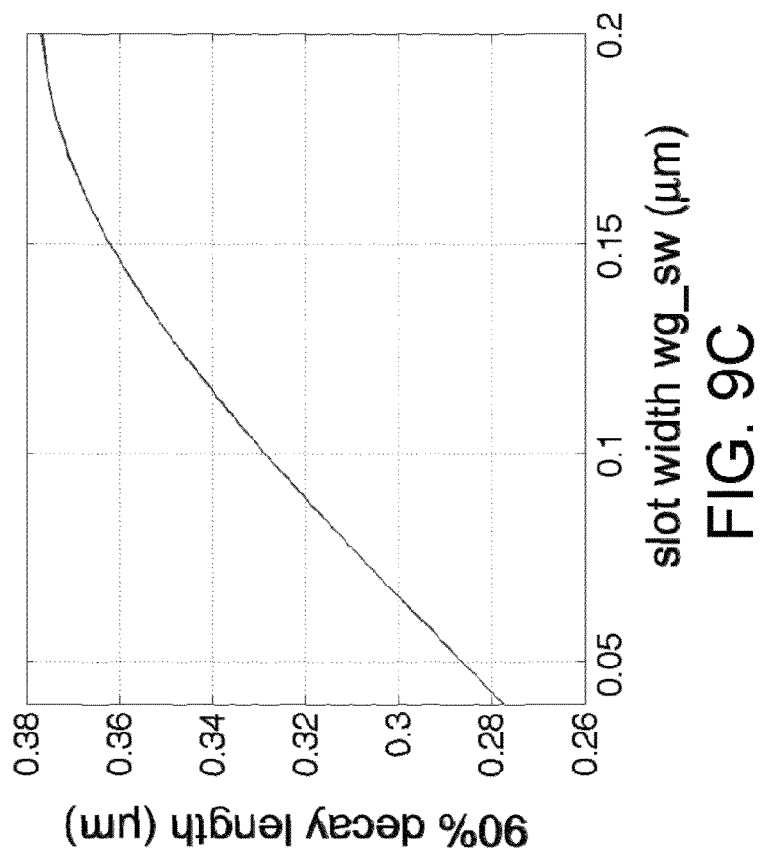
FIG. 9C is a graph illustrating the decay length of the optical field inside the cladding silicon as a function of slot width.

The optical field has a very clear exponential decay in the cladding region, so that the overlap with the implants and the resulting optical losses can be characterized by three numbers: the overlap with the core silicon area (the unetched areas of thickness wg_rh), the overlap with the cladding silicon, and the decay length of the field in the cladding, which parameters vary as shown in FIG. 9. The latter is described as the distance between the edge of the waveguide and the onset of moderate implants (imp_off), such that the overlap of the moderate implant region (imp_c2) with the cladding field is less than 10% of the total cladding optical field overlap.

For example for a 100 nm slot, and an implant offset imp_off=330 nm (90% decay length), 43% (core overlap)+ 0.9×7.7% (90% of cladding overlap) of the field overlaps with the low implant region, while 0.1×7.7% (10% of cladding overlap) of the field overlaps with the moderate implant region.

FIG. 10 shows the capacitance of the SWG as a function of slot width. A RF relative dielectric constant of 4 was taken for both silicon dioxide and for the polymer. The SWG capacitance was simulated by solving Poisson's equation with the well-known PISCES finite-element solver and compared to the parallel plate approximation. Due to the fringe fields, simulated values exceed the parallel plate approximation by an approximately constant amount. For a typical slot width of 100 nm, the fringe fields account for almost half the total capacitance (136 pF/m). Hence, it is very important to base calculations on simulated results.

Series resistance was also simulated with PISCES. However, in this case the obtained resistances were almost exactly equal to estimates based on simple film thickness approximations, even for the core waveguide region where the directions of current flow significantly diverge from the horizontal. Hence these results are not further discussed.

Transmission Line Design

We present a design of a TL by solving Maxwell's equations explicitly with a finite-elements based eigensolver (HFSS). Based on inspection of the TL modes (in particular current distributions inside the silicon) an equivalent lumped element circuit for infinitesimal section lengths is described. Predictive analytical models are then derived that allow calculating the impedance and the excess loss of phase-matched TLs from the SWG group index, capacitance and series resistance. These models are validated by comparison to TL simulation results. It was found that the TL characteristics predicted by the analytical models match the simulation results very well in the appropriate regime.

Geometrical Parameters

We now define primary geometrical parameters based on simulation results in order to achieve phase matching and reasonable TL losses. Phase matching could be expected to be a problem due to the polymer and silicon dioxide index being around 2 at RF frequencies, and thus significantly lower than the group index of the SWG. As it turns out, the substantial capacitive loading induced by the SWG slows down the RF signal to such an extent that the opposite becomes true: It becomes challenging to maintain a low enough TL index. For thin slots below 100 nm it becomes increasingly challenging to phase match the TL while maintaining easy to fabricate geometries. It can be done up to a certain point with thick metal films and small tl_sp, but these parameters are respectively limited by fabrication and waveguide losses.

FIG. 11A through FIG. 11E show the sensitivity of the TL losses and effective index on design parameters (centered on the parameters given in Table 1) as extracted from finite-elements simulations. The group index of the SWG is 3.1, hence this should be the target for the TL effective index in order to obtain phase matching. The design resulted in a TL effective index $n_{eff}$=3.36, which is slightly off target, but results in a negligible efficiency drop (4%) since the typical MZI length is expected to be relatively short (~9 mm for devices optimized for operation at 10 GHz, as discussed hereinbelow). An index of 3.1 could have been obtained by using thicker metal, or reducing the metal-to-metal spacing. However, both are expected to result in more challenging fabrication, and in the case of reduced metal spacing also higher waveguide losses since it brings the metal closer to the waveguides.

The 2 μm metal thickness was primarily driven by TL losses. Below 2 μm, the skin depth of the top and bottom of the metal overlap at 10 GHz and the series resistance of the aluminum lines quickly increases. In general, in order to achieve phase matching to the SWG a large metal stripe width (tl_w) and height (tl_h), and a small metal to metal spacing (tl_sp) were desirable. All of them decrease the linear inductance and thus also decrease the effective index of the loaded TL as explained hereinbelow. Increasing the metal width becomes ineffective past a certain point, both in terms of losses and of phase matching, since the current concentrates in the vicinity of the metal edge facing towards the opposite metal strip.

Equivalent Circuit for Infinitesimal Transmission Line Segments

FIG. 12A shows the equivalent circuit for an infinitesimal section of loaded TL.

The classic telegraph line equivalent circuit ($L_{TL}$, $C_{TL}$ and $R_{TL}$) is complemented by a model for the SWG. The horizontal branch of the SWG model corresponds to currents flowing inside the silicon along the axis of the TL ($J_z$) while $R_{SWG}$ corresponds to currents flowing from the metal lines to the slot ($J_x$) across the series resistance of the SWG. The axes are labeled in FIG. 13A. It should be noted that for a quasi-TEM mode, such as would be obtained for highly conductive silicon, the current would predominantly flow along the axis of the TL and the horizontal branch would be the dominant contributor to the SWG model. On the other hand, a dominant vertical branch ($R_{SWG}$) would correspond to currents inside the silicon flowing predominantly along the x-direction, resulting in a substantial deviation from the quasi-TEM approximation. In this case, FIG. 12A could be simplified into FIG. 12B. The SWG could then be simply modeled by an additional capacitive loading of the TL (expressed as $\overline{C}_{SWG}=C_{SWG}/(1+R_{SWG}^2 C_{SWG}^2 \omega^2)$) combined with a shunt conductance (expressed as $\overline{R}_{SWG}^{-1}=R_{SWG}C_{SWG}^2\omega^2/(1+R_{SWG}^2 C_{SWG}^2\omega^2)$) resulting in excess TL losses. The transformed circuit is shown in FIG. 12C.

In order to motivate the model shown in FIG. 12B, the mode profile of a typical loaded TL is first obtained with a finite-elements mode solver and qualitatively inspected. It is verified that with silicon implant concentrations compatible with acceptable waveguide losses, the current flow inside the silicon is predominantly along the x-direction, and that the H-field, and thus the self-inductance of the TL, are only slightly perturbed by the presence of the SWG, while the E-field, and thus the linear capacitance, are fundamentally modified.

A quantitative validation of the model results from obtaining the values for the TL impedance, phase velocity and transmission losses as a function of frequency via the finite-elements solver and comparing them to the trends predicted by the equivalent circuit (i.e., by fitting the finite-elements results based on formulas derived from the equivalent circuit model, but by leaving numerical values for $L_{SWG}$, $C_{SWG}$, $R_{SWG}$, $L_{TL}$ and $C_{TL}$ as free fitting parameters). As a final validation step it is verified that the fitted $L_{TL}$ and $C_{TL}$ verify the relationship expected from the unloaded metal lines quasi-TEM mode (i.e., $C_0\sqrt{L_{TL}C_{TL}}$; $n_{cladding}$=2), and that the fitted values for $L_{SWG}$, $C_{SWG}$ and $R_{SWG}$ are consistent with the SWG characteristics extracted with PISCES in the electrostatic approximation.

The motivation behind first fitting the curves and then comparing the fitted parameters, rather than directly comparing the finite-elements results to curves estimated based on the PISCES numbers, was to accommodate small changes in the parameter values either due to changes in the meshing, or to more fundamental reasons, while demonstrating quasi-perfect agreement of the functional relationship. As it turned out, the discrepancy between fitted values and independently estimated values was only 4% for the SWG capacitance and 15% for the SWG series resistance. It was unclear prior to detailed numerical analysis whether the capacitance of the unloaded TL and of the SWG could be simply taken as is in the combined model (as would be expected in a geometry with spatially cleanly separated E-fields), or whether spatial overlap of the E-field generated by the metal lines with the conductive silicon would induce sufficient interaction to break this simple model. As it turns out, $C_{TL}$ extracted from the simulated loaded TL properties agrees within 13% with the value extracted from the unloaded TL (with unimplanted, non-conductive silicon), and $L_{TL}$ agrees within 1%.

Another open question was whether the excess TL transmission losses, that is the TL losses generated by current flow inside the implanted silicon, is truly dominated by laterally flowing $J_x$, or whether longitudinal currents ($J_z$) are sufficiently high inside the silicon to have a significant impact on TL losses. Here too, in the investigated implant density regime losses can be almost entirely ascribed to laterally flowing currents.

Transmission Line Mode Profile Properties

It is very informative to inspect the field and current profiles of the TL mode since they provide a qualitative justification for the simplified equivalent circuit model and for the fitting models applied hereinbelow.

FIG. 13A and FIG. 13B show the E- and H-fields of the loaded TL mode. It is apparent that the silicon has very little impact on the H-field. In fact, the H-field closely resembles the distribution of the stand-alone TL. This can be explained by the fact that the current densities in the silicon are more than an order of magnitude lower than in the metal (modeled as aluminum). Hence it is expected that the linear inductance of the loaded TL will be very close to the inductance of the unloaded TL. This conclusion is further reinforced by the fact that the currents in the silicon are mostly along the transverse x-direction, rather than the propagation direction (z), and are thus mostly generating z-components of the H-field that do not contribute to the self-inductance of the TL. The currents in the silicon are breaking the quasi-TE symmetry since they are predominantly transverse. This explains why the TL phase velocity can be significantly different from the cladding material.

The E-field on the other hand is heavily influenced by the presence of the silicon. In fact, most of the voltage is dropped across the slot of the SWG, as required in order to maintain high opto-electronic device performance. It is thus expected for the capacitance of the SWG to be a large portion of the loaded TL capacitance. We will show that the loaded TL capacitance can be closely approximated by the sum of the unloaded TL capacitance and of the SWG capacitance. This increased capacitance slows down the phase velocity of the TL mode, and allows phase matching to the optical SWG mode.

FIG. 14A through FIG. 14D show RF loss distributions and current distributions in the TL. As previously mentioned, it can be seen that $J_z$, in the metal is an order of magnitude larger than the current in the silicon, and the latter is predominantly (again by more than an order of magnitude) along the x-direction. It can also be seen in FIG. 14A that the losses are dominated by resistive losses in the low doping density silicon close to the waveguide.

It might be surprising that the sharp maximum of the E-field in FIG. 13B does not correlate to a corresponding feature in the H-field, as would be expected from a quasi-TEM mode. In such a mode $E_z$ and $H_z$ are zero, such that the following holds:

$$\nabla \times H = \varepsilon \frac{\check{Z}E}{\check{Z}t} \Rightarrow -\frac{\check{Z}H_y}{\check{Z}z} = \varepsilon \frac{\check{Z}E_x}{\check{Z}t} \Rightarrow E_x = \quad (7)$$

$$\frac{2\pi n}{\lambda} \frac{H_y}{\varepsilon \omega} = -\frac{Z_0}{n} H_y \Rightarrow \frac{\check{Z}H_x}{\check{Z}z} = \varepsilon \frac{\check{Z}E_y}{\check{Z}t} \Rightarrow E_y = \frac{2\pi n}{\lambda} \frac{H_x}{\varepsilon \omega} = -\frac{Z_0}{n} H_x$$

In other words, $E_x$ and $H_y$ strongly correlate with each other. The discrepancy between the E- and H-fields profiles is thus only possible due to the non-TEM nature of the mode. The relationship between the E- and H-fields in the loaded TL can be established by inspecting the fields generated by the current and charge distributions of the SWG alone. Since the currents inside the SWG are mostly along the x-direction, they can be approximated, and independently solved for, by considering a lumped capacitor with the SWG geometry driven by an equal voltage applied along its entire length. For symmetry reasons, when the SWG is driven in such a fashion the internal H-field is along the z-direction and the E-field confined to the xy plane with zero derivatives along the z-direction. The resulting fields are shown in FIG. 15A and FIG. 15B. Then $$\nabla \times H = \varepsilon \frac{\check{Z}E}{\check{Z}t} \Longrightarrow \frac{\check{Z}H_z}{\check{Z}y} = \quad (8)$$

$$\varepsilon \frac{\check{Z}E_x}{\check{Z}t} \Longrightarrow E_x = -\frac{i}{l_y} \frac{H_z}{\varepsilon \omega} \Longrightarrow -\frac{\check{Z}H_z}{\check{Z}x} = \varepsilon \frac{\check{Z}E_y}{\check{Z}t} \Longrightarrow E_y = \frac{i}{l_x} \frac{H_z}{\varepsilon \omega}$$

where $l_x$ and $l_y$ are the characteristic length scales over which $H_z$ varies in the x and y directions. In other words, the E-field in the SWG correlates to $H_z$, the non-TEM component of the H-field. It can be seen in FIG. 15B that the gradient of $H_z$ is mostly confined to the slot. $H_z$ does not register in the H-field magnitude shown in FIG. 13A because it is two orders of magnitude smaller than the ambient $H_y$ field generated by the metal stripes. This is a consequence of the fact that the length scale over which $H_z$ varies, the slot height wg_rh=0.2 µm is much smaller than the wavelength (~1 cm), so that a very small $H_z$ component can still generate a strong enough gradient to account for $E_x$ inside the slot. Even though $E_x$ is approximately 40 times larger in the slot than outside (the spacing between the metal lines is 40 times the slot width), the corresponding $H_z$-field is more than two orders of magnitude smaller.

Equivalent Circuit Validation and Loaded Transmission Line Modeling

FIG. 16A shows the simulated impedance and FIG. 16 B shows the effective index of the loaded TL, as well as fitting results assuming functional relationships derived from the equivalent circuit model. The impedance and the effective index were independently fitted, with excellent consistency between the two resulting sets of fitting parameters, and between the fitting parameters and a-priori calculated capacitance and resistance values, thus validating the equivalent circuit model. The slight discrepancy between fit and simulation data at low frequencies is due to the linear resistance of the metal lines that was not included in the analytical model. At low frequencies the series resistance of the aluminum lines becomes comparable to $iL\omega$ which leads to a divergence of the TL impedance $Z=\sqrt{(i\omega L + R_{MetalSeries})/i\omega C}$ from its ideal high-speed value $Z=\sqrt{L/C}$, and of the TL index $n_{eff}=c_0\sqrt{(L+R_{MetalSeries})/i\omega)C}$ from its ideal high-speed value $n_{eff}=c_0\sqrt{LC}$. It can be seen in both sets of curves that at high frequencies the characteristics asymptotically converge towards those of the unloaded TL, as the operation frequency exceeds the RC time constant of the SWG and the SWG capacitance is screened.

The following relation for the loaded TL impedance can be easily derived from the equivalent circuit and was taken as a basis for the functional form of the fit:

$$Z = \frac{1}{2}\sqrt{\frac{L}{C+G/i\omega}} = \quad (9)$$

$$\frac{1}{2}\sqrt{\frac{L_{TL}}{C_{TL}+C_{SWG}\frac{1}{1+i\frac{f}{BW}}}} = \frac{1}{2}\sqrt{\frac{1}{\left(\frac{C_{TL}}{L_{TL}}\right)+\left(\frac{C_{SWG}}{L_{TL}}\right)\frac{1}{1+i\frac{f}{BW}}}}$$

where the left side of the equation is the standard equation for the telegraph line impedance (with shunt conductance G). In the right side $L_{TL}$ is the inductance of the unloaded TL (assumed to be equal to the inductance of the loaded TL), $C_{TL}$ is the capacitance of the unloaded TL, $C_{SWG}$ is the capacitance of the SWG and BW is the intrinsic electrical bandwidth of the SWG, $\frac{1}{2\pi}R_{SWG}C_{SWG}$, where $R_{SWG}$ is the series resistance. BW is the bandwidth of the SWG and not of the complete MZI, since the latter also suffers from frequency dependent TL losses. The additional factor ½ is to take into account that the complete TL of the push-pull MZI is of the form GSG, while the modeled TL is half the structure, GS, corresponding to a single waveguide arm, i.e., $L_{TL}$ and $C_{TL}$ correspond to the single arm structure, while the system impedance Z is for the complete push-pull structure. The fitted free parameters are $[C_{TL}/L_{TL}]_{Z-fit}$, $[C_{SWG}/L_{TL}]_{Z-fit}$, and $[BW]_{Z-fit}$. The following model can be derived from the equivalent circuit for the TL effective index:

$$n_{eff} = c_0\sqrt{L(C+G/i\omega)} = c_0\sqrt{C_{TL}L_{TL}+C_{SWG}L_{TL}\frac{1}{1+i\frac{f}{BW}}} \quad (10)$$

where $c_0$ is the speed of light in vacuum. The fitted parameters are $[C_{TL}L_{TL}]_{n-fit}$, $[C_{SWG}L_{TL}]_{n-fit}$ and $[BW]_{n-fit}$ (fitted independently from the impedance fit).

Table 3 summarizes the fitted parameters and compares the results of the two fits, as well as the fits to expected results obtained independently with PISCES.

TABLE 3

| Variable | Extraction | Extracted Value | Independently Simulated |
|---|---|---|---|
| BW | $[BZ]_{z\text{-}fit}$ | 35.5 GHz | 43 GHz (PISCES) |
| BW | $[BZ]_{n\text{-}fit}$ | 36.1 GHz | 43 GHz (PISCES) |
| $C_{TL}$ | $\text{sqrt}([C_{TL}/L_{TL}]_{z\text{-}fit} \times [C_{TL}L_{TL}]_{n\text{-}fit})$ | 166 pF/m | 151 pF/m (HFSS, unloaded TL) |
| $C_{SWG}$ | $\text{sqrt}([C_{SWG}/L_{TL}]_{z\text{-}fit} \times [C_{SWG}L_{TL}]_{n\text{-}fit})$ | 141 pF/m | 136 pF/m (PISCES) |
| R | $1/2\pi C_{SWG} BW$ | 31.4 mΩ × m | 27.2 mΩ × m (PISCES) |
| $L_{TL}$ | $\text{sqrt}([C_{SWG}L_{TL}]_{n\text{-}fit}/[C_{SWG}/L_{TL}]_{z\text{-}fit})$ | 377 nH/m | 393 nH/m (HFSS, unloaded TL) |
| $L_{TL}$ | $\text{sqrt}([C_{TL}L_{TL}]_{n\text{-}fit}/[C_{TL}/L_{TL}]_{z\text{-}fit})$ | 426 nH/m | 393 nH/m (HFSS, unloaded TL) |
| $n_{TL}$ | $c_0 \text{sqrt}(L_{TL}C_{TL})$ | 2.37 | 2.31 (HFSS, unloaded TL) |

The excess transmission losses induced in the resistive silicon can be modeled as the power dissipated by the series resistance of the waveguide, and are given by $$\alpha = \frac{1.0}{\log(10)} Re\left(\frac{i\omega C_{SWG}}{1+i\frac{f}{BW}}\right)(2Z) = \frac{10}{\log(10)} \frac{\omega^2 C_{SWG}^2 R_{SWG}}{1+\left(\frac{f}{BW}\right)^2}(2Z) \quad (11)$$

where α is the attenuation coefficient in dB/length (for transmitted RF power). Losses are normalized by $Z^{-1}$ since the power transported by the TL is $U^2/Z$. As in the previous equations, the factor 2 is to account for the full GSG structure, since Z is the impedance for the complete structure, while $C_{SWG}$ and $R_{SWG}$ are the linear capacitance and resistance of one SWG only. FIG. 17C and FIG. 17D show the excess TL losses generated by the resistive silicon (dashed curve), as well as the excess losses predicted by Eq. 11. In this case, the model was not fitted but directly calculated based on the values reported in Table 3. It can be seen that the agreement between the simulated and predicted excess losses is relatively good overall, and particularly good below the cutoff frequency of the SWG. It can also be seen that the unloaded TL losses have the expected square root dependency on frequency, while the excess losses have a quadratic dependency as predicted by Eq. 11.

In order to obtain phase matching, the effective index of the TL given by Eq. 10 has to equate the group index of the SWG. In a system with relatively homogeneous dielectric indices such as here (the RF indices of the polymer and of silicon dioxide are both ~2), $L_{TL}C_{TL}$ is constrained by the phase velocity of the unloaded TEM TL mode ($L_{TL}C_{TL} \sim n_{cladding}^2/c_0^2$), so that the second term, $L_{TL}C_{SWG}$, has to be adjusted to obtain phase matching. In other words, Eq. 10 determines the target for $L_{TL}$, and the latter can be obtained by adjusting the geometry of the metal lines. For example in the case of the coplanar waveguide geometry used here, increasing the line to line spacing, reducing the metal thickness or the metal width, all increase the self-inductance of the line, the consequences of which on the TL index can be seen in FIG. 11A through 11E.

Device Optimization and Analog Link Performance

The models and parameterized SWG properties previously derived are used to evaluate performance of SWG based MZI modulators, as well as to optimize these modulators for analog optical links and to evaluate analog optical link performance. Some type of FOM is always required to optimize the MZI in order to arbitrate between insertion losses and $V_\pi$. However, the MZI performance shown hereinbelow can also serve as an indication of achievable modulator performance for other applications, since optimized device characteristics tend to be relatively insensitive on the details of the optimization function.

Analog Link Figure of Merit

The low $V_\pi$ of SWG based polymer MZIs is particularly attractive for analog optical links. In the latter, the low $V_\pi$ translates directly into a reduced noise figure (NF). Analog links are very noise sensitive, since any noise added to the waveform within the bandwidth of interest permanently destroys information, as opposed to digital data where thresholding operations and error correcting codes allow removing noise and perfect signal recovery.

Here, a simple amplitude modulated analog optical link shown in FIG. 18 is used as a vehicle to explore the potential of SWG based polymer modulators for analog data transmission. A more detailed theory of amplitude modulated analog optical links can for example be found in C. Cox et al., "Techniques and Performance of Intensity-Modulation Direct-Detection Analog Optical Links", IEEE Trans. Microwave Theory and Tech. 45(8), 1375-1383 (1997). In the last decade, many techniques have been investigated to increase the spur free dynamic range and reduce the NF. For example, relative intensity noise (RIN) can be normalized out by using a two fiber link with a balanced receiver and the effect of shot noise can be reduced by biasing the MZI away from the 3 dB point in order to achieve a reduced average optical power. These biasing techniques can be straightforwardly applied to the devices described here.

In order to minimize the NF, optical analog links are often operated at power levels sufficiently high for the receiver noise to become negligible. Such a system is then limited by transmitter (Tx) noise and by shot noise, so that laser RIN and shot noise dominate the NF of the link. The electrical power gain of an analog link consisting of an MZI biased at the 3 dB point, an optical link, a photodetector and a transimpedance amplifier (TIA) is given by $$G = \left(g_{TIA} Rsp \frac{\pi}{V_\pi} \frac{P_{in} IL}{2}\right)^2 \frac{Z_{in}}{Z_{out}} = \left(\frac{\pi}{V_\pi} g_{TIA} I_{av}\right)^2 \frac{Z_{in}}{Z_{out}} \quad (12)$$

where $g_{TIA}$ is the transimpedance gain of the TIA, Rsp is the responsivity of the photodetector, $P_{in}$ is the optical power entering the modulator, IL corresponds to the insertion losses limited MZI transmission, $Z_{in}$ is the impedance of the TL driving the MZI, and $Z_{out}$ is the output impedance of the receiver that is matched to following electronics. Assuming that the TL is driven by an impedance matched driver, the input noise $N_{in}$ is $k_B T \times B$, where $k_B$ is Boltzmann's constant, T=290K the standard noise temperature and B the bandwidth of the link. Neglecting the TIA noise, the excess noise created by the link is $$N_{ex} = (2qI_{av} \cdot B)\frac{g_{TIA}^2}{Z_{out}} + (I_{av}^2 10^{RIN/10} B)\frac{g_{TIA}^2}{Z_{out}} \quad (13)$$

where q is the charge of the electron and RIN is specified in dB/Hz. The NF is then given by $$NF = 10\log 10\left(1 + \frac{N_{ex}}{GN_{in}}\right) = \qquad (14)$$

$$10\log 10\left(1 + \frac{V_\pi^2}{Z_{in}}\frac{1}{\pi^2 k_B T}\left(\frac{4q}{P_{in}IL \cdot Rsp} + 10^{RIN/10}\right)\right)$$

It should be noted that the noise associated to the termination resistor of the MZI has been neglected in Eq. 13 and Eq. 14. This is a much smaller contribution than the noise of the source resistor ($N_{in}$) because it propagates along the TL in the opposite direction than the light in the waveguide, so that there is no phase matching. A (wide) upper bound can be obtained by equating it to $N_{in}$. Even then it would only have a small impact on the typical NF considered here (e.g., adding 0.4 dB to a 10 dB NF).

In the low RIN limit, the modulator FOM resulting in minimization of the analog link NF is $ILZ_{in}P_{in}/V_\pi^2$. Due to the high optical power densities inside the SWG, $P_{in}$ might be limited by the power handling capability of the device rather than available laser output power. In that case, $P_{in}$ scales with the slot width of the SWG in addition to $V_\pi$ and $Z_{in}$, resulting in an analog link performance relatively insensitive to the slot width, as discussed hereinbelow. For a laser power limited link, the analog link markedly improves with an approximately linear dependence on the inverse slot width. In the high RIN limit, the FOM of the modulator is $Z_{in}/V_\pi^2$ and also has an approximately linear dependence on the inverse slot width. In the following the MZIs are optimized for optical analog links operated in the shot noise limited regime, and the FOM chosen to minimize the link NF is $ILZ_{in}P_{in}/V_\pi^2$ assuming a reliability limited input power. For a fixed slot width (in which case only the device length and the implant profiles are being optimized), this FOM can be reduced to $IL/V_\pi^2$ since $Z_{in}$ and $P_{in}$ are fixed for a given waveguide geometry.

Device Optimization

In order to derive device performance, it is helpful to define limits on material properties and process quality. Here we assume relatively conservative numbers of $r_{33}$=50 pm/V and unimplanted (baseline) waveguide losses of 6 dB/cm. To place this in context, electro-optic coefficients up to 300 pm/V have been recently demonstrated for advanced organic nonlinear polymers, and we recently measured baseline SWG losses of 8 dB/cm. An $r_{33}$ of 30 pm/V has been previously experimentally demonstrated in SWGs using polymers with an ideal, fully poled coefficient of 100 pm/V (the discrepancy was attributed to partial poling). It is expected that waveguide losses can be improved with some process development. $V_\pi$ for higher $r_{33}$ can be derived by linearly rescaling results reported here.

Device parameters (length and implant profiles) are optimized in order to achieve maximum $IL/V_\pi^2$ at fixed slot width. The optimum waveguide width wg_rw is extracted from FIG. 5. The implant profile (imp_c1, imp_c2 and imp_off) is then optimized to obtain maximum $IL/V_\pi^2$. For a given implant profile, waveguide losses are calculated based on field overlap integrals as shown in FIG. 9A and FIG. 9B, and the absorption data given in the literature. TL losses are evaluated by adding the excess losses estimated with Eq. 11 to the baseline losses of an unloaded TL. Assuming perfect phase matching, the $V_\pi$ of the SWG modulators is $$V_s = \frac{\lambda}{4L_{eff}}\left(\frac{Ov \cdot n_{polymer}^3 r_{33}}{2wg\_sw}\right)^{-1}\sqrt{1+(f/BW)^2} \qquad (15)$$

where BW is the electrical bandwidth of the SWG and $L_{eff}$ is the effective length of the TL and is given by $$L_{eff} = \int_0^L e^{-\frac{\alpha}{2}l}dl \qquad (16)$$

A phase matched MZI of length L with TL attenuation losses is equivalent to a phase matched MZI of length $L_{eff}$ with lossless RF transmission. In Eq. 16 the relevant losses are $\alpha/2$ since $\alpha$ corresponds to the RF power losses, but the relevant drive strength is voltage. The optimum device length, e.g., the length that maximizes $IL/V_\pi^2$, can be related to TL losses ($\alpha$ in neper/length) and SWG losses ($\beta$ in neper/length) with following relationship:

$$L_{opt} = \frac{2}{\alpha}\log\left(1 + \frac{\alpha}{\beta}\right) \qquad (17)$$

FIG. 19A through FIG. 19D show the performance metrics of the optimized MZI. It might be considered surprising that the insertion losses decrease for devices optimized for higher frequencies. This is due to the fact that the optimized device length shrinks faster than the increase in implanted waveguide losses, as shown in FIG. 20C. It is also important to notice that the TL impedance is highly sensitive to slot width. This impacts analog link performance, as is discussed hereinbelow. In a process where the implant concentrations are fixed, imp_off remains a lithographically defined free parameter that can partially compensate for the fixed implants. Rather than staying on the order of the evanescent field folding length (~300 nm), it will then have much larger variations as a function of optimization frequency.

It can be seen that the input impedance of the GSG TL is very mismatched from 50Ω However the device can be driven with two 50Ω inputs in a dual RF drive configuration, since each of the individual SG lines are approximately 50Ω (and exactly so for a 120 nm slot). This dual drive could for example be provided by an RF power splitter. Assuming a 50 pm/V polymer and a 100 nm slot, a DC drive voltage of $V_\pi$<200 mV is predicted for a device optimized for and operated at 10 GHz (with a 26 GHz bandwidth). This can be compared to the PhotonicSystems, part number PSI-3600-MOD-D1 device with a $V_\pi$ of 1.1 V at 12 GHz. In other words, even assuming modest nonlinear coefficients, the polymer device is expected to beat the best lithium niobate based devices by a factor 6 in drive voltage, and approximately a factor 30 in drive power ($V_\pi^2/Z_{in}$). Assuming best of class polymers (300 pm/V), the SWG drive voltage would be reduced to <35 mV, or a factor ~1000 improvement in drive power. In order to obtain a fair comparison, the PhotonicSystems, part number PSI-3600-MOD-D1 device is assumed to be driven in dual RF drive configuration, i.e., both arms of the MZI are supplied with an RF voltage so that the reported $V_\pi$ is halved relative to the single RF drive voltage. It should be noted that here a halved $V_\pi$ is assumed rather than the $1/\sqrt{2}$ improvement mentioned in the PSI-3600-MOD-D1 device datasheet, since in the datasheet the $V_\pi$ is referred to the input of the RF power splitter supplying the dual RF drive, while in this discussion the $V_\pi$ is referred to the input ports of the MZI. The power penalty is taken into account at the system level via $Z_{in}$ in Eq. 14.

One might wonder how dependant these results are on the specific choice of FOM. FIG. 21 shows TL and SWG propagation losses as a function of the lowest concentration implant (inside and in the direct vicinity of the SWG) that primarily drives SWG and TL losses. It can be seen that the optimum concentration is located at the elbow of both transmission loss curves. It is thus expected for the optimized implant concentration to be relatively insensitive on the particular FOM. Indeed, optimizing devices for a FOM of $IL/V_\pi^X$ results in implant concentrations for the lowest density implant imp_c1 ranging from 4.8e16 cm$^{-3}$ for X=1 to 6.3e16 cm$^{-3}$ for X=3 at 10 GHz, and from 2.3e17 cm$^{-3}$ for X=1 to 4.0e17 cm$^{-3}$ for X=3 at 100 GHz. The device length $2\log(1+X\alpha/2\beta)/\alpha$ also stays within a factor ~2, ranging from 5.3 mm to 12.3 mm at 10 GHz and from 2.0 mm to 3.0 mm at 100 GHz.

Analog Link Performance

Based on existing commercial reliability studies with long term reliability (extrapolated 25 years/85 C), we conservatively estimate that a 100 nm slot SWG should be able to handle at least a few mW of power at the beginning of the SWG. This should be really understood as a lower bound to the power handling capability, since the estimate is based on reproducing similar optical power densities in the polymer as in studies that showed no degradation in accelerated testing. We also assume an additional 3 dB of insertion losses to account for chip to fiber transitions (that is, typical single mode laser packaging losses are taken as a baseline, since they also consist of submicron waveguides) and 2 dB of insertion losses for other on-chip optics on either side of the MZI (for example, y-junctions or directional couplers, as well as SWG to ridge waveguide mode converters). In other words, there are an additional 10 dB total additional transmission losses assumed, with 5 dB before the MZI and 5 dB after the MZI. In FIG. 22A through FIG. 22C, optical power levels refer to the optical power at the beginning of individual SWGs, since it is assumed that power levels are reliability limited, but schemes are also compared in terms of required overall laser power. Semiconductor lasers with ultra-low RIN of −160 dB/Hz can be obtained (e.g. JDS Uniphase CQF938 series) and such lasers are assumed to be used here. Finally, nonlinear coefficients of 150 pm/V are assumed, which is close to the coefficients demonstrated for best of class polymers (300 pm/V), but slightly reduced to allow for suboptimal poling, small polymer instability or more conventional materials.

Typical receiver power levels are on the order of 0.1 mW (i.e., after attenuation due to typical insertion losses and fiber to chip coupling losses). Receiver noise generally cannot be ignored at these optical power levels, so that receiver noise needs to be added to $N_{ex}$ in Eq. 14. The development of ultra-low capacitance integrated photodetectors has enabled the design of receivers with record low noise floors which would allow the NF to be shot noise dominated even at power levels as low as a few hundred μW. However, for simplicity's sake typical receive optical subassembly (ROSA) input referred noise currents of $I_{n,receiver}$=35 pA/$\sqrt{Hz}$ (rms) are assumed, as can be obtained from off-the-shelf parts. The photodetector sensitivity is assumed to be 0.85 A/W.

FIG. 22A, FIG. 22B and FIG. 22C show the NF for analog links as a function of slot width and optical power assuming an $r_{33}$ of 150 pm/V. When the slot width is varied in FIG. 22A, the optical power launched into the SWG is also intrinsically varied to maintain a constant optical power density in the polymer (corresponding to 15 mW launched into a 100 nm slot SWG). The NF is relatively insensitive to slot width because the drive voltage enhancements are negated by reduced TL impedance and reduced optical power levels, which are used to maintain constant, reliability limited optical power densities in the polymer region. For this reason the slot width can be adjusted to obtain joint impedance and phase matching without incurring any major penalties. Another technique used to increase the optical overlap, increasing the film thickness as previously discussed, would yield very different results. In this case the SWG capacitance would also increase, and hence the TL impedance decrease. However, the optical power density in the polymer would decrease, allowing increasing $P_{in}$ (as opposed to having to decrease it). Thus, it is expected that the NF would scale very favorably with increasing silicon film thickness.

FIG. 22B and FIG. 22C compare the simple link shown in FIG. 18 to a dual fiber solution with the complementary outputs of the MZI sent to a balanced receiver. This is a common technique to normalize out RIN. The balanced receiver also allows halving the optical power relative to the single ended link in the shot noise and receiver noise limited regime.

Link Architecture with Homodyne Amplification

We now address other architecture improvements targeted specifically at alleviating the power handling limitations of SWG based MZIs by using homodyne amplification of the signal inside the transmitter sub-system.

This scheme is shown in FIG. 23. Essentially, the idea is to modulate the phase in one arm only, but to allow the power levels in the other arm ($P_{amp}$) to be substantially higher, thus amplifying the signal. Since the lower arm can be made with a conventional waveguide without exposure to the polymer, it can be allowed to transport much higher power levels. The optical signal then scales as $\sqrt{P_{sig}P_{amp}}$, thus resulting in amplified signal levels. As a penalty for using a single arm phase modulation rather than a push-pull configuration, $V_\pi$ is multiplied by two. A side benefit of this architecture is that the TL impedance is doubled, since it is only driving a single SWG. The shot noise contribution to the noise factor (proportional to the ratio of shot noise power to link gain and input noise) scales as $$\frac{P_{shot}}{GN_{in}} : \frac{\frac{P_{amp}}{2}}{(2Z_{in})\left(\sqrt{P_{sig}P_{amp}}\frac{\pi}{(2V_\pi)}\right)^2} = \frac{V_\pi^2}{Z_{in}\pi^2 P_{sig}} = \frac{2V_\pi^2}{Z_{in}\pi^2 P_{in}} \quad (18)$$

where $Z_{in}$ and $V_\pi$ denote the values for the equivalent push-pull architecture (and are both multiplied by 2 to adjust for the single RF drive). Interestingly, this is exactly the same number that is obtained for the push-pull architecture when both $P_{sig}$ and $P_{in}$ are reliability limited (i.e. $P_{sig}=P_{in}/2$ since $P_{in}$ is equally split between two SWGs).

The receiver noise contribution to the noise factor can be reduced by increasing $P_{amp}$, since the signal levels can be arbitrarily increased. The big drawback of the single ended homodyne scheme is that it is very sensitive to RIN, since the average power levels (~$P_{amp}/2$) are much larger than in the push-pull configuration. We found that in a typical single ended configuration using these devices, the increased sensitivity to RIN cancels out the benefits from the reduced receiver noise. For this reason, the homodyne scheme is further investigated only in the context of a balanced receiver link. FIG. 24A, FIG. 24B and FIG. 24C show estimated performance of this analog link architecture. It can be seen that for high values of $P_{amp}$, the NF approaches the shot noise limit. Note that in this context $P_{sig}$ refers to the on-chip power at the beginning of the SWG and $P_{amp}$ refers to the on-chip power at the input port of the combiner (directional coupler).

It should also be noted that this scheme only makes sense when the power handling capabilities of the phase modulator and the passive optics are highly asymmetric as with polymer based SWGs, since it would otherwise be more optimum to split the power equally between two phase modulators in a push-pull scheme.

Table 2 presents the optical power inside the SWGs and required laser power for various link architectures. The required laser power for the balanced link utilizing the Lithium Niobate modulator was derived assuming a total modulator insertion loss of 9 dB and a $V_\pi$ of 1.35V at 18 GHz. Numbers in parenthesis correspond to values obtained for an ideal, noiseless receiver. Coupling losses for bringing $P_{amp}$ onto the chip are assumed to be 3 dB, since no on chip mode conversion is required. Unless otherwise specified, $r_{33}$ is assumed to be 150 pm/V. Maximum electrical input power is evaluated assuming the peak-to-peak input voltage should be kept below $V_\pi/10$ in order to maintain sufficient link linearity.

TABLE 4

| Architecture | Optical Power in SWG | Laser Power | Noise Figure | Max. Elec. Input Power |
|---|---|---|---|---|
| Single Ended, Push-Pull | 17 mW (5 mW) | 110 mW | NF = 10 @ 20 GHz | −32 dBm |
| Balanced, Push-Pull | 8 mW (2 mW) | 50 mW | NF = 10 @ 20 GHz | −32 dBm |
| Balanced, Homodyne, $P_{amp}$ = 20 mW | 3 mW (2 mW) | 50 mW | NF = 10 @ 20 GHz | −29 dBm |
| Balanced, Homodyne, $P_{amp}$ = 20 mW $r_{33}$ reduced to 100 pm/V | 7 mW (5 mW) | 60 mW | NF = 10 @ 20 GHz | −25 dBm |
| Balanced, Homodyne, $P_{amp}$ = 100 mW | 10 mW (10 mW) | 230 mW | NF = 10 @ 20 GHz | −29 dBm |
| Balanced, Push-Pull, 1.35 V Lithium Niobate | | 1.4 W | NF = 10 @ 20 GHz | −5 dBm |

The Lithium Niobate modulator has a $V_\pi$ that is 16 times larger than what is predicted for a SWG based MZI with $r_{33}$=150 pm/V. It would thus be expected of the required optical power for the SWG based modulator to be 250 times smaller in order to obtain the same NF. However the Lithium Niobate modulator has smaller insertion losses (9 dB versus 17 dB) and the corresponding link does not suffer from receiver noise due to the high optical power levels. After taking these effects into account, the power reduction resulting from using SWG modulators is expected to be a factor ~30. Beyond allowing many more analog links for a given amount of power, this is expected to be a significant improvement since 50 mW can be readily sourced by a semiconductor laser diode.

Table 4 also summarizes the maximum input electrical power limited by link linearity, assuming that the peak-to-peak input voltage should remain below 10% of $V_\pi$. While the maximum input powers, on the order of 1 μW, are relatively low, they seem to be roughly in line with a wireless receiver with a typical sensitivity floor of −65 dBm and a 30 dB preamplifier.

It is expected that these systems will be practical since the required optical power levels for the balanced homodyne architecture are within the range of optical power densities that polymers have been shown to reliably handle, with some room to allow for reduced $r_{33}$ and less heroic, presumably more stable polymers. For example, a 20 GHz, 5 dB NF could still be obtained by launching 7 mW of power into a 100 nm slot SWG with $r_{33}$=100 pm/V. Finally, the links described here are expected to be substantially improved by using the best of class ultra low noise receivers, since they are exceptionally sensitive to receiver noise due to the fact that the optical power levels are more than an order of magnitude lower than those in conventional optical analog links, and are getting close to the power levels typically seen in digital links.

We have optimized transmission line driven slot waveguide based Mach-Zehnder interferometers and applied them to a typical optical analog link architecture. Even under conservative assumptions, these devices feature record low driving voltages ($V_\pi$ <200 mV at 10 GHz). With best of class electro-optic materials, their driving voltage could be reduced to below 35 mV. Since low driving voltage scales directly into low transmitter noise figures, these devices will have a large impact on analog optical links.

As part of this description, several fundamental aspects of the devices were derived. The fundamental limit to the optical overlap enhancement was explained. Analytical models for loaded transmission lines were derived based on an equivalent circuit model, and validated by comparison with finite-elements simulation results. This allows joint RF-optical optimization without iterating transmission line designs and provides guidance on the design trade-offs. Sensitivities of analog link performance on design parameters were calculated. In particular, it was determined, unexpectedly, that the link performance is relatively insensitive to slot width when optical power levels are limited by the power handling capability of the device. It is expected that devices built out of thicker silicon will yield even higher link performance. Finally, a transmitter architecture was shown that overcomes receiver noise even when exposing the slot waveguides to very low optical power levels, thus enhancing long term system reliability.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A Mach-Zehnder interferometer having a balanced output, comprising:
   a slotted wave guide having at least two silicon elements defining a slot therebetween, said at least two silicon elements having an electro-optically active material disposed within said slot, and configured to apply an electromagnetic field to said electro-optically active material, said slotted waveguide configured as a first arm of said Mach-Zehnder interferometer, and an optical fiber configured as a second arm of said Mach-Zehnder interferometer;
   an optical input port of said Mach-Zehnder interferometer configured to receive an optical signal comprising a signal component having a signal amplitude Psig and a power component having a power amplitude Pamp, said optical input port configured to apply said signal component to
   said first arm of said Mach-Zehnder interferometer and configured to apply said power component to said second arm of said Mach-Zehnder interferometer;
   an optical output port of said Mach-Zehnder interferometer configured to provide a balanced optical output signal; and
   an electrical input port configured to receive an input electrical signal having a radio frequency component with instantaneous amplitude V, and having a driver configured to apply said radio frequency signal component as a data signal relative to a ground signal to said at least one of said silicon elements of said slotted wave guide.

2. The Mach-Zehnder interferometer of claim 1, wherein said Mach-Zehnder interferometer is configured to provide a balanced optical signal having an amplitude A1

$$A_1 = \frac{P_{sig}}{2} + \frac{P_{amp}}{2} + \sqrt{P_{sig}P_{amp}}\sin\left(\frac{\pi}{V_\pi}\frac{V}{2}\right)$$

on one arm and an amplitude A2

$$A_2 = \frac{P_{sig}}{2} + \frac{P_{amp}}{2} + \sqrt{P_{sig}P_{amp}}\sin\left(\frac{\pi}{V_\pi}\frac{V}{2}\right)$$

on another arm.

3. The Mach-Zehnder interferometer of claim 1, wherein said input electrical signal is an analog signal.

4. The Mach-Zehnder interferometer of claim 1, wherein said input electrical signal is a digital signal.

5. The Mach-Zehnder interferometer of claim 1, wherein said Mach-Zehnder interferometer is configured to operate at a frequency of 10 GHz.

6. The Mach-Zehnder interferometer of claim 1, wherein said Mach-Zehnder interferometer is configured to operate at a frequency of 20 GHz.

7. The Mach-Zehnder interferometer of claim 1, wherein said Mach-Zehnder interferometer is configured to operate at a frequency of 50 GHz.

8. The Mach-Zehnder interferometer of claim 1, wherein said signal component having a signal amplitude Psig is unmodulated.

9. The Mach-Zehnder interferometer of claim 1, wherein said power component having a power amplitude Pamp is unmodulated.

10. The Mach-Zehnder interferometer of claim 1, further comprising a fiber optic link and a balanced photodetector receiver.

11. A Mach-Zehnder interferometer having a single-ended output, comprising:
    a first slotted wave guide having at least two silicon elements defining a first slot therebetween, said at least two silicon elements having an electro-optically active material disposed within said first slot, a first of said at least two silicon elements configured as a ground conductor and a second of said at least two silicon elements configured as a signal conductor, said at least two silicon elements configured to apply an electromagnetic field to said electro-optically active material in a first direction, said first slotted waveguide configured as a first arm of said Mach-Zehnder interferometer, and
    a second slotted wave guide having at least two silicon elements defining a second slot therebetween, said at least two silicon elements having an electro-optically active material disposed within said second slot, a first of said at least two silicon elements configured as a ground conductor and a second of said at least two silicon elements configured as a signal conductor, said at least two silicon elements configured to apply an electromagnetic field to said electro-optically active material in a second direction antiparallel to said first direction, said second slotted waveguide configured as a second arm of said Mach-Zehnder interferometer;
    said silicon element of said first slotted wave guide configured as a signal conductor and said silicon element of said second slotted wave guide configured as a signal conductor being in electrical contact;
    an optical input port of said Mach-Zehnder interferometer configured to receive an optical carrier signal, said optical input port configured to apply said optical carrier signal to said first arm of said Mach-Zehnder interferometer and to said second arm of said Mach-Zehnder interferometer;
    an optical output port of said Mach-Zehnder interferometer configured to provide a single-ended optical output signal; and
    an electrical input port configured to receive an input electrical signal having a radio frequency component with instantaneous amplitude V, and having a driver configured to apply said radio frequency signal component as a data signal relative to a ground signal to said silicon element of said first slotted wave guide configured as a signal conductor and to said silicon element of said second slotted wave guide configured as a signal conductor of, and to apply said ground signal to each of said first of said at least two silicon elements configured as a ground conductor of each of said first and second slotted wave guides;
    said Mach-Zehnder interferometer configured to provide at said optical output port a single-ended optical signal proportional to 2 times V.

12. The Mach-Zehnder interferometer of claim 11, wherein said input electrical signal is an analog signal.

13. The Mach-Zehnder interferometer of claim 11, wherein said input electrical signal is a digital signal.

14. The Mach-Zehnder interferometer of claim 11, wherein said Mach-Zehnder interferometer is configured to operate at a frequency of 10 GHz.

15. The Mach-Zehnder interferometer of claim 11, wherein said Mach-Zehnder interferometer is configured to operate at a frequency of 20 GHz.

16. The Mach-Zehnder interferometer of claim 11, wherein said Mach-Zehnder interferometer is configured to operate at a frequency of 50 GHz.

17. The Mach-Zehnder interferometer of claim 11, further comprising a fiber optic link and a photodetector receiver.

18. The Mach-Zehnder interferometer of claim 17, wherein said photodetector receiver comprises a transimpedance amplifier.

* * * * *